(12) United States Patent
Sato et al.

(10) Patent No.: US 7,717,027 B2
(45) Date of Patent: May 18, 2010

(54) BEVERAGE EXTRACTOR

(75) Inventors: Takeshi Sato, Isesaki (JP); Takashi Nagasawa, Isesaki (JP); Takeshi Onda, Isesaki (JP)

(73) Assignee: Sanden Corporation, Isesaki-shi, Gunma (JP)

( * ) Notice: Subject to any disclaimer, the term of this patent is extended or adjusted under 35 U.S.C. 154(b) by 666 days.

(21) Appl. No.: 11/624,607

(22) Filed: Jan. 18, 2007

(65) Prior Publication Data
US 2007/0169640 A1  Jul. 26, 2007

(30) Foreign Application Priority Data

Jan. 24, 2006 (JP) ............... 2006-014683
Aug. 23, 2006 (JP) ............... 2006-226942
Oct. 26, 2006 (JP) ............... 2006-291485

(51) Int. Cl.
 *A47J 31/36* (2006.01)
(52) U.S. Cl. ............... 99/302 P; 99/284; 99/287
(58) Field of Classification Search ............... 99/302 P, 99/287, 302 R, 284; 222/486, 485, 493, 222/522
See application file for complete search history.

(56) References Cited

U.S. PATENT DOCUMENTS 4,993,601 A    2/1991  Nakayama et al.
5,014,963 A    5/1991  Nakayama et al.
5,033,648 A    7/1991  Nakayama et al.
5,097,989 A    3/1992  Nakayama et al.
5,105,982 A    4/1992  Takahashi et al.
5,622,099 A *  4/1997  Frei ............................. 99/287
6,807,898 B2 * 10/2004  De Koning et al. ....... 99/289 R
7,353,752 B2 *  4/2008  Blanc ........................... 99/298
7,370,572 B2 *  5/2008  De'Longhi ................ 99/302 P
2006/0254428 A1 * 11/2006 Glucksman et al. ........ 99/302 P
2007/0012196 A1 *  1/2007 Sato ............................ 99/348

FOREIGN PATENT DOCUMENTS

EP    1308115 A1   5/2003
EP    1743553 A1   1/2007
JP    2002-008126 A  1/2002

* cited by examiner

*Primary Examiner*—Reginald L Alexander
(74) *Attorney, Agent, or Firm*—Baker Botts L.L.P.

(57) ABSTRACT

The invention provides a beverage extractor permitting extraction of a beverage of high quality irrespective of its type. The extractor is provided with a first extraction channel for letting the beverage extracted in a cylinder flow into the extraction pipe via beverage outlet holes of a second piston having a prescribed first bore and a second extraction channel via a communication hole having a prescribed second bore, which is smaller in bore than the outlet holes, for letting the beverage extracted in the cylinder flow into the extraction pipe, and the first and second extraction channels are switched over between each other by the movement of the second piston. This makes it possible to select an extraction channel suitable for the type of beverage, whether regular coffee or espresso coffee, and accordingly to extract a beverage of high quality irrespective of the type of beverage.

15 Claims, 15 Drawing Sheets

BEVERAGE EXTRACTOR

BACKGROUND OF THE INVENTION

1. Field of the Invention

The present invention relates to a beverage extractor for extracting a beverage from a raw material, such as ground powder of coffee beans.

2. Description of the Related Art

One of the known beverage extractors of this kind is provided with a cylinder for accommodating a raw material, a piston disposed to be movable within the cylinder, a hot water feed pipe for feeding hot water into the cylinder and an extraction pipe for letting flow out the beverage extracted in the cylinder. With this extractor, regular coffee or espresso coffee is extracted by feeding the raw material, which is coffee beans ground to the grain size for either regular coffee or espresso coffee, into the cylinder, compressing the powder between pistons and feeding hot water into the cylinder.

In this beverage extractor, it is necessary to feed hot water into the cylinder, when regular coffee is to be extracted, under a pressure of 0.1 MPa to 0.3 MPa or, when espresso coffee is to be extracted, under a pressure of about 0.9 MPa. For this reason, it is necessary to keep the aperture of the extraction pipe channel smaller when espresso coffee is to be extracted than when regular coffee is to be extracted to keep the pressure of hot water to be fed into the cylinder at the required level.

However, since this beverage extractor uses a common extraction pipe for extracting regular coffee and espresso coffee and extraction of regular coffee with an extraction pipe suitable for the extraction of espresso coffee takes a much longer time because the hot water feeding pressure should be reduced. Taking a longer time to extract the beverage may invite excessive extraction of the content of the raw material and therefore degradation of the quality of the extracted beverage.

BRIEF SUMMARY OF THE INVENTION

An object of the present invention is to provide a beverage extractor capable of extracting a beverage of high quality irrespective of the type of beverage.

In order to achieve this object, a beverage extractor according to the invention comprises a cylinder for accommodating a raw material; a piston disposed to be movable within the cylinder; a hot water feed pipe for supplying hot water into the cylinder; an extraction pipe for causing a beverage extracted in the cylinder to flow out; a first extraction channel for causing the beverage extracted in the cylinder to flow into the extraction pipe via outlet holes of a prescribed first bore; a second extraction channel for causing the beverage extracted in the cylinder to flow into the extraction pipe via outlet holes of a prescribed second bore, which is smaller than the first bore; and a channel switching mechanism for switching over the first extraction channel and the second extraction channel between each other by moving the piston.

This configuration, as it allows the extract channel to let the beverage flow into the extraction pipe to be switched over by the movement of the piston between the first extraction channel for letting the beverage flow into the extraction pipe via the outlet holes having the prescribed first bore and the second extraction channel via the outlet holes having the prescribed second bore, which is smaller than the first bore, for letting the beverage flow into the extraction pipe, makes it possible to select an extraction channel suitable for the type of beverage to be extracted. Therefore, the select ability of an extraction channel suitable for the type of beverage to be extracted by movement of the piston makes possible extraction of beverage of high quality irrespective of the type of beverage.

This and other objects, features and advantages of the present invention will become apparent from the following description when taken in conjunction with the accompanying drawings.

DETAILED DESCRIPTION OF THE INVENTION

FIG. 1 through FIG. 20 show a first preferred embodiment of the present invention. In the following description, "right" means the right side, "left", the left side, "toward the viewer", the downward direction, "away from the viewer", the upward direction, "upward", the surface, and "downward", the depth, all in FIG. 2.

Figure 1:
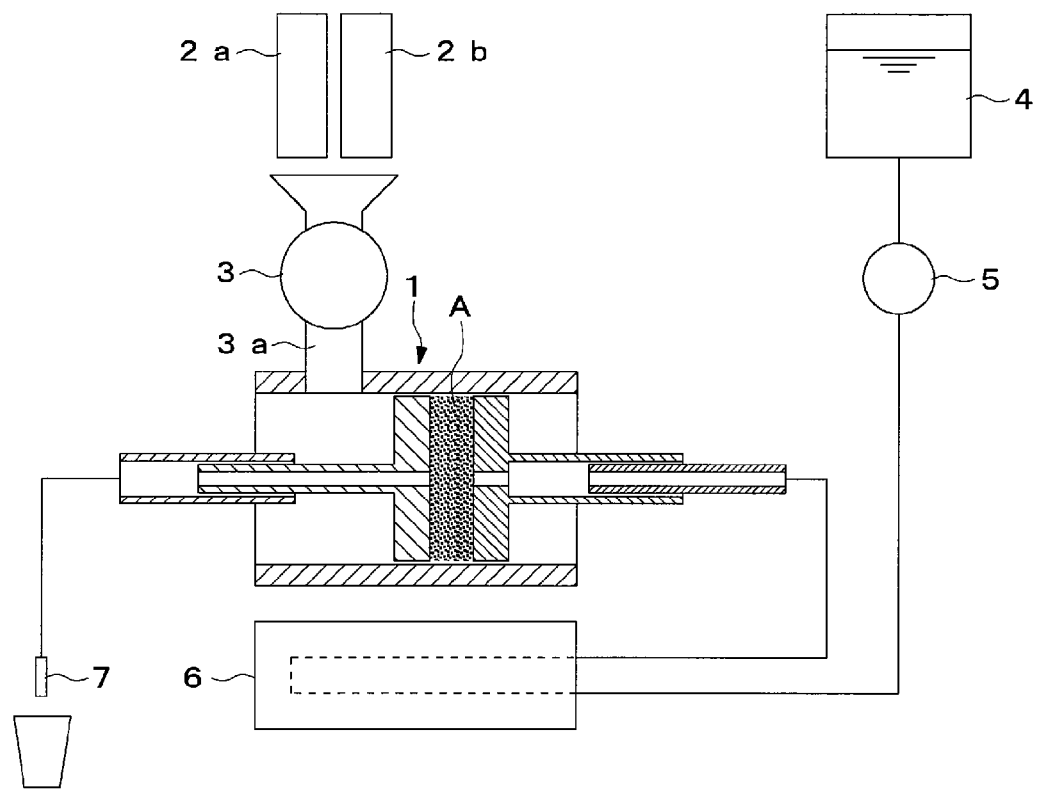
FIG. 1 shows a schematic configuration of a beverage extractor, which is a first preferred embodiment of the present invention.
Figure 2:
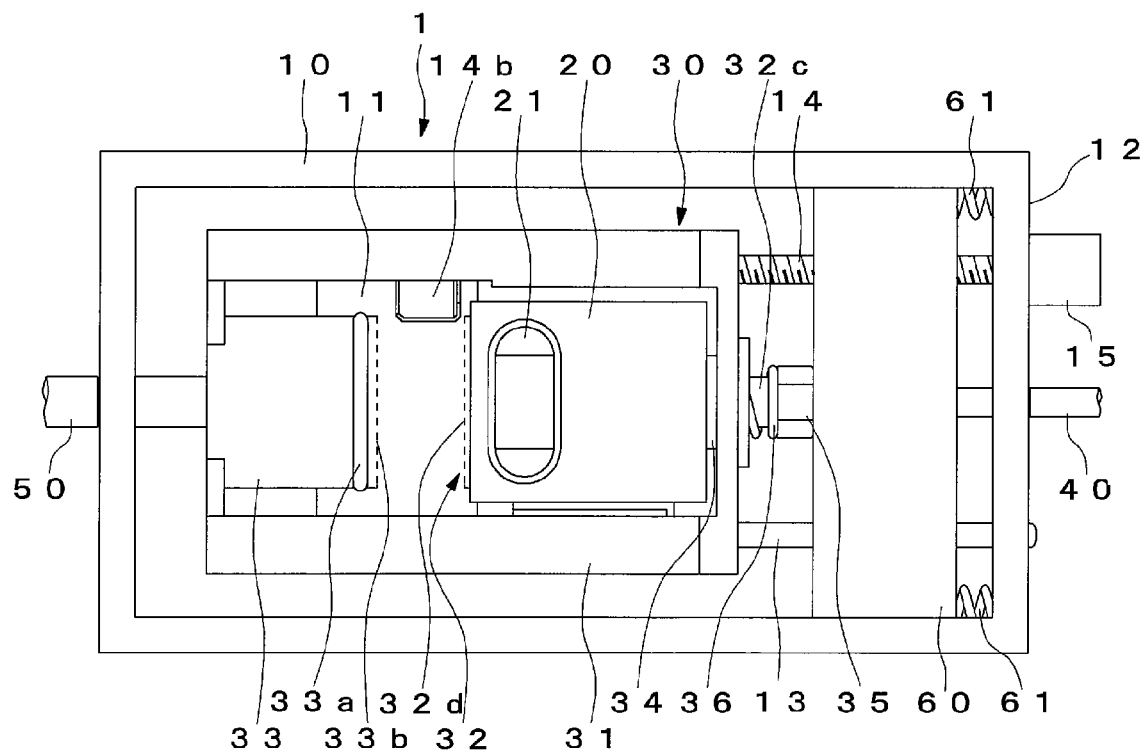
FIG. 2, a plan of the extractor.
Figure 3:
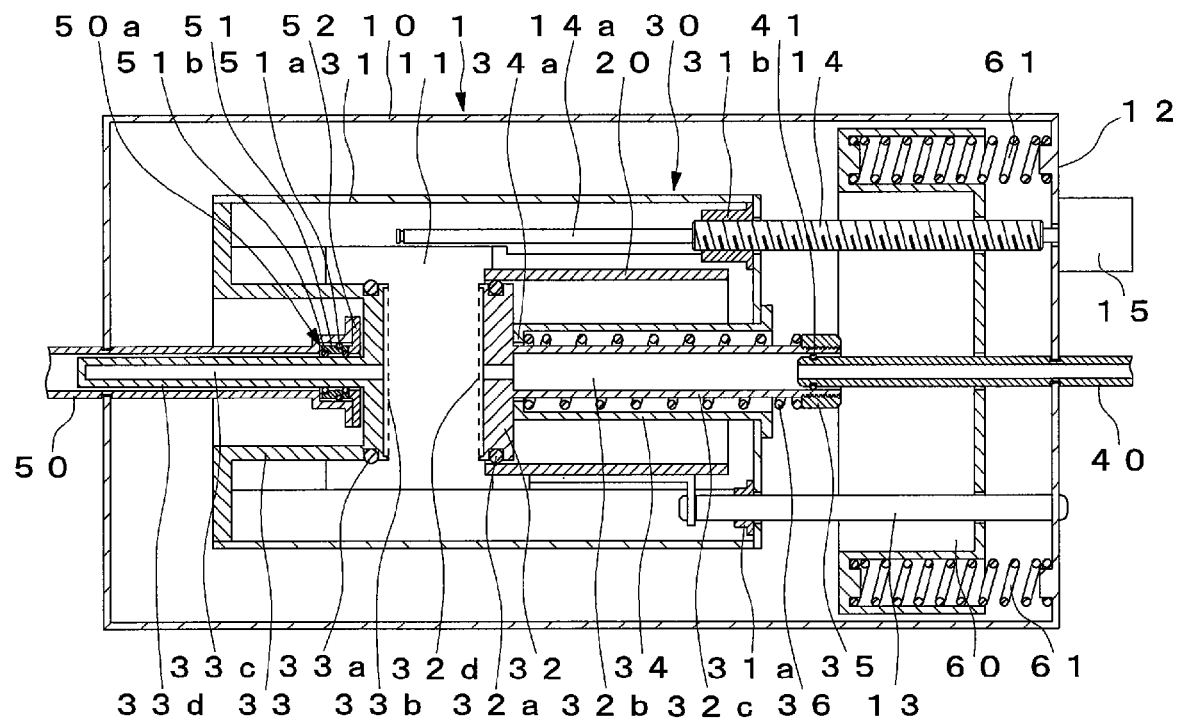
FIG. 3, a planar section of the extractor.
Figure 4:
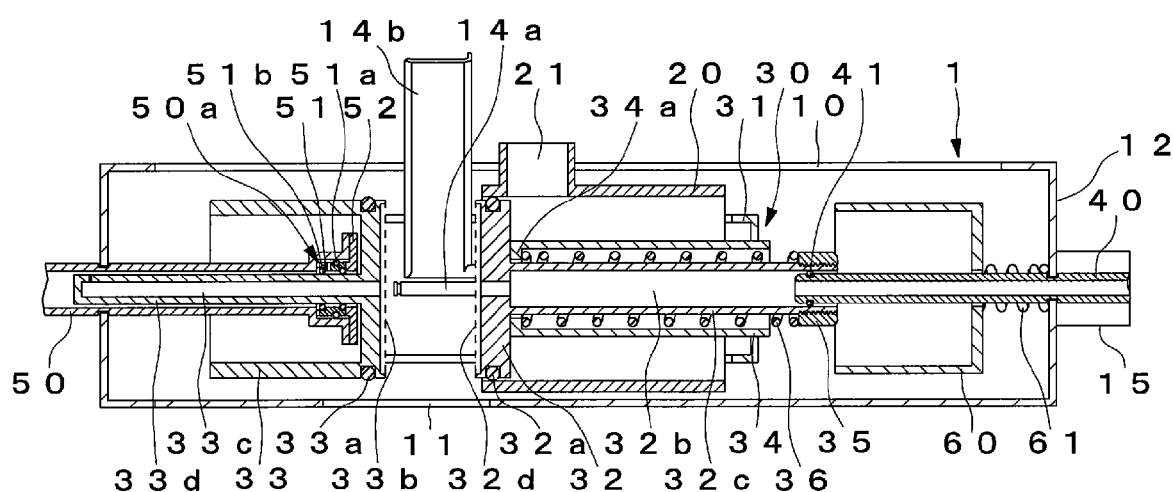
FIG. 4, a frontal section of the extractor.

This beverage extractor is capable of selectively extract either of regular coffee and espresso coffee. The beverage extractor, as shown in FIG. 1, is provided with an extractor 1; canisters 2a and 2b, one for accommodating coffee beans for regular coffee and the other for accommodating coffee beans for espresso coffee; a mill 3 for grinding coffee beans fed from the canisters 2a and 2b into a powder state; a water tank 4 for storing water; a pump 5 for pressure-feeding water; and an electrically heated boiler 6 for heating the water pressure-fed by the pump 5. The beverage extractor is so configured that powder of ground coffee beans is inputted to the extractor 1 as raw material A, to which hot water is fed, and the extracted liquid is poured into a cup via a nozzle 7. Herein, the electrically heated boiler 6 is arranged underneath the extractor 1, and heat emitted from the electrically heated boiler 6 covers the whole extractor 1.

The extractor 1 is provided with a cylinder 20 fixed to a cylinder base 10, a piston unit 30 disposed to be movable in the right-and-left directions relative to the cylinder 20, a hot water feed pipe 40 fixed to the right flank of the cylinder base 10, and an extraction pipe 50 fixed to the left flank of the cylinder base 10.

The cylinder base 10 is formed of a box-shaped member open at the top, and the cylinder 20 is fixed substantially at its center in both back-and-forth and right-and-left directions of the bottom face. In the bottom face of the cylinder base 10 positioned to the left of the cylinder 20, there is disposed a used raw material discharge outlet 11 through which used raw material A' discharged from the opening on the left side of the cylinder 20 is to let drop into a used raw material collector (not shown) provided at the lower position. On a side wall 12 on the right side flank of the cylinder base 10, there is arranged a guide shaft 13 extending leftward from the front end side, and the piston unit 30 is supported by the guide shaft 13 to be movable in the right-and-left directions. On the side wall 12 on the right side flank of the cylinder base 10, there is provided a drive shaft 14 extending leftward from the rear end, and the piston unit 30 is movable in the right-and-left directions by the revolutions of the drive shaft 14.

The drive shaft 14, which is a rod-shaped member having a spiral thread formed on its outer circumferential face, is turned back and forth by an electric motor 15 disposed on the outside of the side wall 12 on the right side flank of the cylinder base 10.

The cylinder 20, formed of a cylindrical member both ends of which are open, is fixed on the bottom face of the cylinder base 10 with its center axis oriented in the right-and-left directions. The cylinder 20 also has in its circumferential face positioned toward the top left a raw material inlet 21 extending the back-and-forth directions, and a chute 3a for guiding the raw material A, prepared by grinding coffee beans into a powder state with the mill 3, into the cylinder 20 can be connected to the raw material inlet 21.

The piston unit 30 is provided with a frame 31 supported by the cylinder base 10 to be movable in the right-and-left directions relative to the cylinder 20, a first piston 32 as the raw material compressing piston linked to be movable in the right-and-left directions relative to the frame 31 and disposed to be movable within the cylinder 20, and a second piston 33 fixed opposite the first piston 32 to the frame 31 as a piston permitting insertion into and withdrawal from the cylinder 20 through its left end.

The frame 31 is disposed as to surround the front, rear and right sides of the cylinder 20, and the second piston 33 is fixed to its left end. A bearing 31a into which the guide shaft 13 is inserted is provided toward the front end of the right flank of the frame 31, and the frame 31 is guided in the right-and-left directions along the guide shaft 13. Toward the rear end of the right flank of the frame 31, there is disposed a nut 31b into which the drive shaft 14 is to be screwed, and the revolution of the drive shaft 14 causes the frame 31 to move in the right-and-left directions.

The first piston 32 is so disposed as to fit onto the inner circumferential face of the cylinder 20, and its outer circumference toward the tip is provided in the circumferential direction with a piston ring 32a for keeping the inside of the cylinder 20 airtight. A piston rod 32c extending rightward and having a hot water feed channel 32b open at its right end is disposed in the central part of the right flank in the radial direction of the first piston 32. On the left flank of the first piston 32, there is provided a hot water feed plate 32d having a plurality of hot water feed holes all over. The first piston 32 is so linked to a piston guide 34 fixed to the frame 31 to be movable in the right-and-left directions within a prescribed range.

The piston guide 34, formed of a cylindrical member fixed to the right flank of the frame 31 with its center axis oriented in the right-and-left directions, allows the piston rod 32c of the first piston 32 to be inserted inside. The piston guide 34 also has an extending part 34a in the circumferential direction on the inner circumferential face of the left end. The piston rod 32c of the first piston 32 is inserted through the left end of the piston guide 34, and a nut 35 is fitted to the outer circumferential face of the end of the piston rod 32c. Thus, the first piston 32 is disposed to be movable in the right-and-left directions relative to the piston guide 34 within a range that the right flank of the first piston 32 and the left flank of the nut 35 are in contact with the extending part 34a. Further, a coil-shaped piston urging spring 36 is wound around the piston rod 32c positioned between the extending part 34a and the nut 35 to urge the first piston 32 toward the right direction relative to the frame 31.

Figure 5:
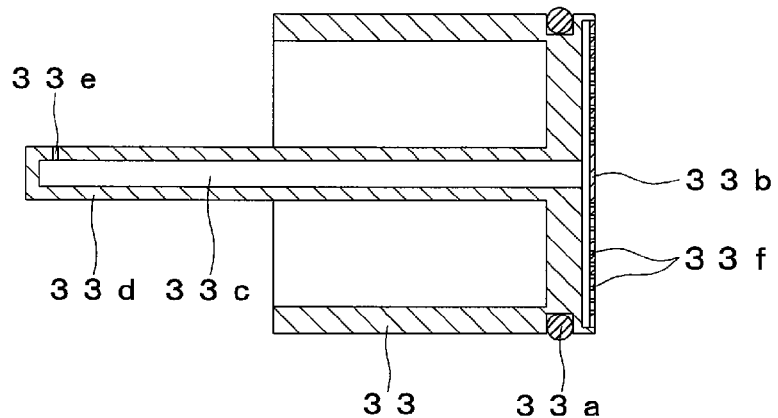
FIG. 5, a section of a second piston.
Figure 6:
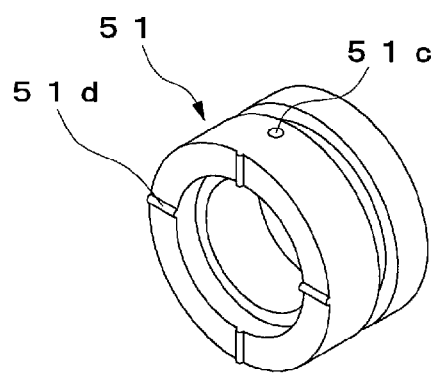
FIG. 6, a perspective view of a channel switching member.

The second piston 33 is disposed to permit fitting to the inner circumferential face of the cylinder 20, and its outer circumferential face toward the tip is provided in the circumferential direction with a piston ring 33a for keeping the inside of the cylinder 20 airtight. On the right flank of the second piston 33, there is provided a filter 33b formed of a metal planar-shaped member and having a plurality of beverage outlet holes 33f. A piston rod 33d extending leftward and having an extraction channel 33c inside, extending in the right-and-left directions, is disposed in the central part of the left flank in the radial direction of the second piston 33. On the circumferential face of the piston rod 33d toward its left end, there is provided a beverage outlet hole 33e having a prescribed first bore, through which the whole beverage flowing through the extraction channel 33c flows out. The beverage outlet holes 33f of the filter 33b are arranged all over the filter 33b except the central part in the radial direction positioned near the input side of the extraction channel 33c as shown in FIG. 5. The holes prevent the hot water fed between the first piston 32 and the second piston 33 of the cylinder 20 from linearly flowing into the extraction channel 33c but cause it to permeate the whole volume of the raw material A inputted between the first piston 32 and the second piston 33 of the cylinder 20.

The hot water feed pipe 40, formed of a tubular member extending in the right-and-left directions, is in a state of being inserted into the hot water feed channel 32b of the first piston 32 which moves in the right-and-left directions. A seal ring 41 to keep the inside of the hot water feed channel 32b airtight is disposed around the outer circumferential face of the hot water feed pipe 40 toward its left end to enable the hot water flowing through the hot water feed pipe 40 to enter into the hot water feed channel 32b without leaking.

The piston rod 33d of the second piston 33 moving in the right-and-left directions is inserted into the extraction pipe 50, formed of a tubular member extending in the right-and-left directions, from the right end side. An expanded part 50a, where the bore is greater than the rest of the pipe, is disposed within the extraction pipe 50 at its right end. The expanded part 50a is provided with a channel switching member 51 to switch the extraction channel of the flowing beverage from the extraction channel 33c of the second piston 33 to the extraction pipe 50.

Figure 7:
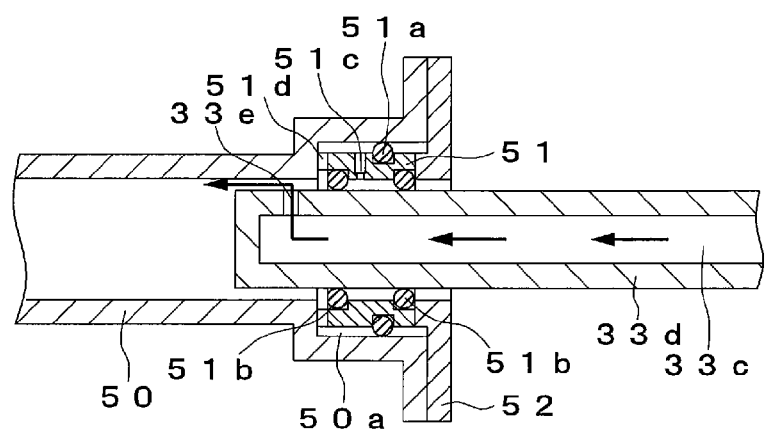
FIG. 7, a section of the essential part of the extraction pipe in a state in which a first extraction channel is used as the extraction channel.
Figure 8:
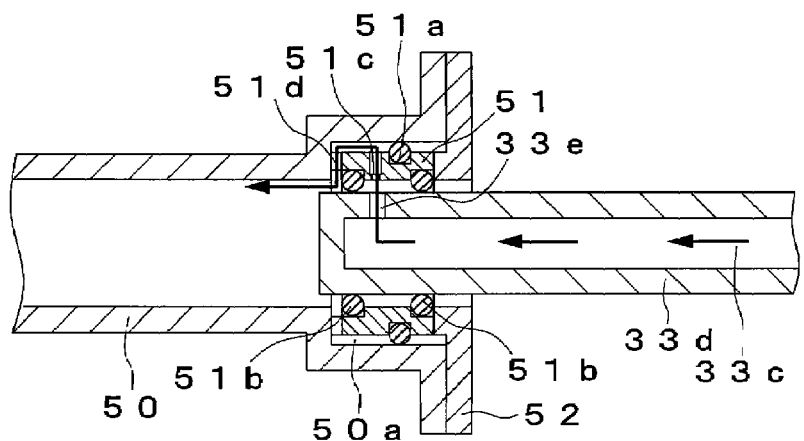
FIG. 8, a section of the essential part of the extraction pipe in a state in which a second extraction channel is used as the extraction channel.

The channel switching member 51, formed of a cylindrical member having an external diameter slightly smaller than the bore of the expanded part 50a, is inserted, with its center axis oriented in the right-and-left directions, into the expanded part 50a through the right end of the extraction pipe 50. The channel switching member 51 is fixed within the expanded part 50a by a blocking plate 52 formed in an annual shape to block the end of the extraction pipe 50. The outer circumferential face of the channel switching member 51 is provided, in substantially the central part in the direction of its center axis, with a seal ring 51a for blocking the gap between the inside of the extraction pipe 50 and the outer circumferential face of the channel switching member 51. Also, the inner circumferential face of the channel switching member 51 is provided, at each end in the direction of its center axis, with a seal ring 51b for blocking the gap between the inner circumferential face of the channel switching member 51 and the outer circumferential face of the piston rod 32d. Further, a communication hole 5c to establish communication between the span between the seal rings 51b on the inner circumferential face side on the one hand and the left side (downstream side in the flowing direction of the extract) of the seal ring 51a on the outer circumferential face side on the other. The communication hole 51c is a hole having a second bore, which is smaller than the first bore of the beverage outlet hole 33e. Further, the channel switching member 51 is provided, on the left side end face in the direction of its center axis, with four projections 51d at intervals between them in the circumferential direction to create a gap, through which the extract is to flow, between the left side end face of the channel switching member 51 and the face of the expanded part 50a extending in the radial direction. Thus, when the beverage outlet hole 33e of the second piston 33 is positioned to the left of the channel switching member 51, a first extraction channel to establish direct communication between the beverage outlet hole 33e and the inside of the extraction pipe 50 as shown in FIG. 7. Or when the beverage outlet hole 33e of the second piston 33 is positioned between the seal rings 51b on the inner circumferential face of the channel switching member 51, a second extraction channel is formed between the beverage outlet hole 33e and the inside of the extraction pipe 50 via the communication hole 51c, the gap between the external face of the channel switching member 51 and the internal face of the expanded part 50a as shown in FIG. 8.

To the right of the piston unit 30, an end of the piston rod 32c of the first piston 32 is disposed in contact with it, and a raw material compressing member 60 which gives a force to move the first piston 32 rightward relative to the frame 31 moving rightward is disposed there. The raw material compressing member 60 is provided to be movable in the right-and-left directions, and a pair of coil-shaped raw material compressing springs 61, arranged forward and backward, intervene between the member and the right side wall 12 of the cylinder base 10. Each of the raw material compressing springs 61 has a stronger urging force than the piston urging spring 36, and moves the first piston 32 leftward against the urging force of the piston urging spring 36.

The piston unit 30, when the second extraction channel is used as the extraction channel, is positioned farther to the right than when the first extraction channel is used. For this reason, the extent compression by each of the raw material compressing springs 61 is greater when the second extraction channel is used than when the first extraction channel is used as the extraction channel, and so is the compressive force working on the raw material A.

A used raw material discharge shaft 14a extending in the right-and-left directions is linked to the left end of the drive shaft 14, and revolves together with the drive shaft 14. A used raw material discharge plate 14b for sweeping downward the used raw material A' shoved out of the cylinder 20 through its left end is linked to the used raw material discharge shaft 14a. The used raw material discharge plate 14b turns together with the revolution of the used raw material discharge shaft 14a, and when its revolution is restricted, only the used raw material discharge shaft 14a turns.

Figure 9:
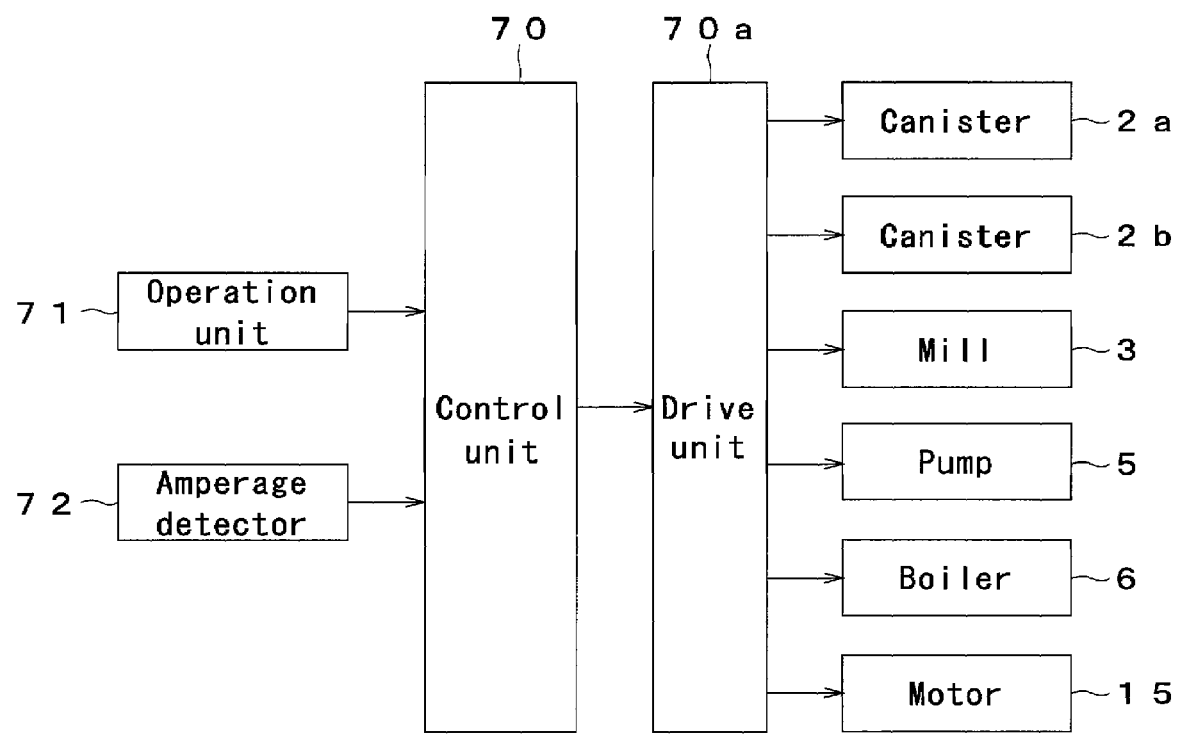
FIG. 9, a block diagram of the control system.

This beverage extractor is provided with a control unit 70 and a drive unit 70a as shown in FIG. 9.

The control unit 70 is formed of a microcomputer, whose memory stores programs regarding the extraction of beverages. An operation unit 71 comprising commodity selection buttons (not shown) and other items for sending signals regarding the type of the selected beverage and its extraction quantity to the control unit 70 is connected to the control unit 70. An amperage detector 72 for detecting the amperage of the current flowing to the motor 15 is also connected to the control unit 70, and its detection signals are transmitted to the control unit 70. The control unit 70 computes from the amperage detected by the amperage detector 72 the force with which the first piston 32 and the second piston 33 compress the raw material A.

To the drive unit 70a, the canisters 2a and 2b, the mill 3, the pump 5, the boiler 6 and the motor 15 are connected, and the drive unit 70a transmits drive signals to the canisters 2a and 2b, the mill 3, the pump 5, the boiler 6 and the motor 15 on the basis of signals from the control unit 70.

In the standby state of the extractor 1 in the beverage extractor configured as described above, the first piston 32 is positioned to the right of the raw material inlet 21 in the cylinder 20, and the second piston 33, to the left of the raw material inlet 21.

Figure 10:
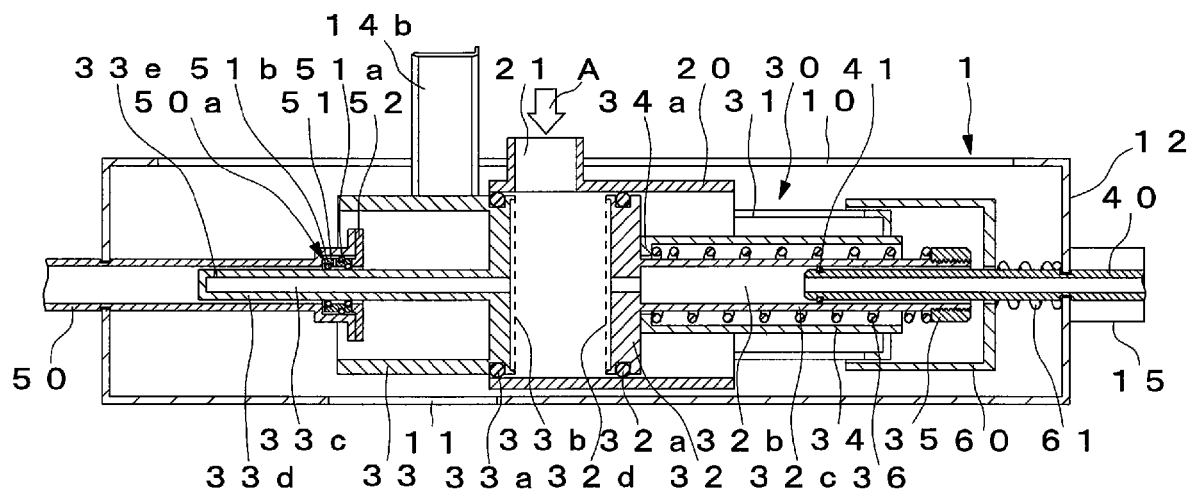
FIG. 10 illustrates the operation of the extractor to extract regular coffee.

When regular coffee is to be extracted, first, beans for regular coffee are taken out of the canister 2a and ground into a powder form with the mill 3, and the powder is inputted to the cylinder 20 via the raw material inlet 21 as the raw material A (6 grams of it here) as shown in FIG. 10.

Figure 11:
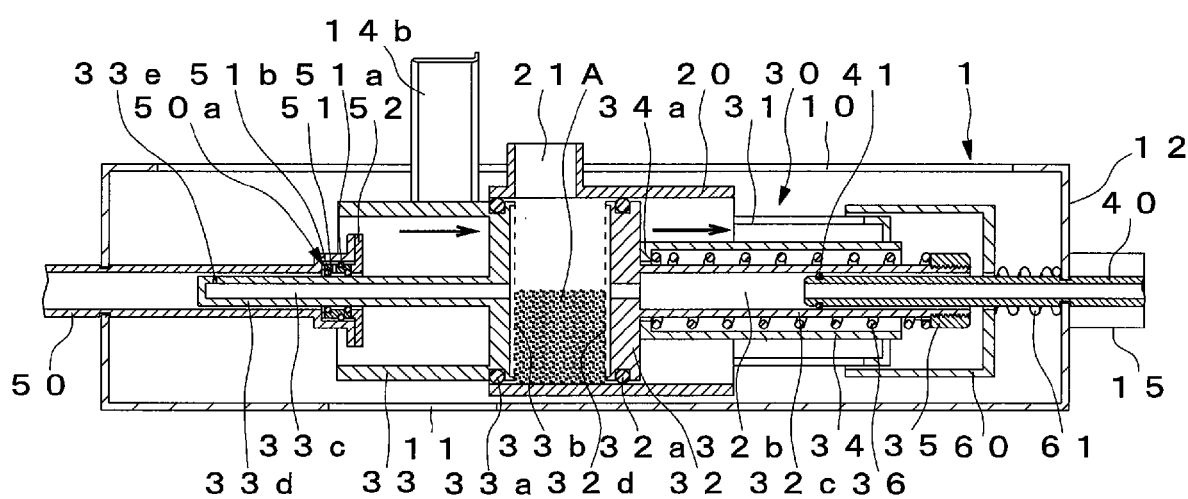
FIG. 11 also illustrates the operation of the extractor to extract regular coffee.
Figure 12:
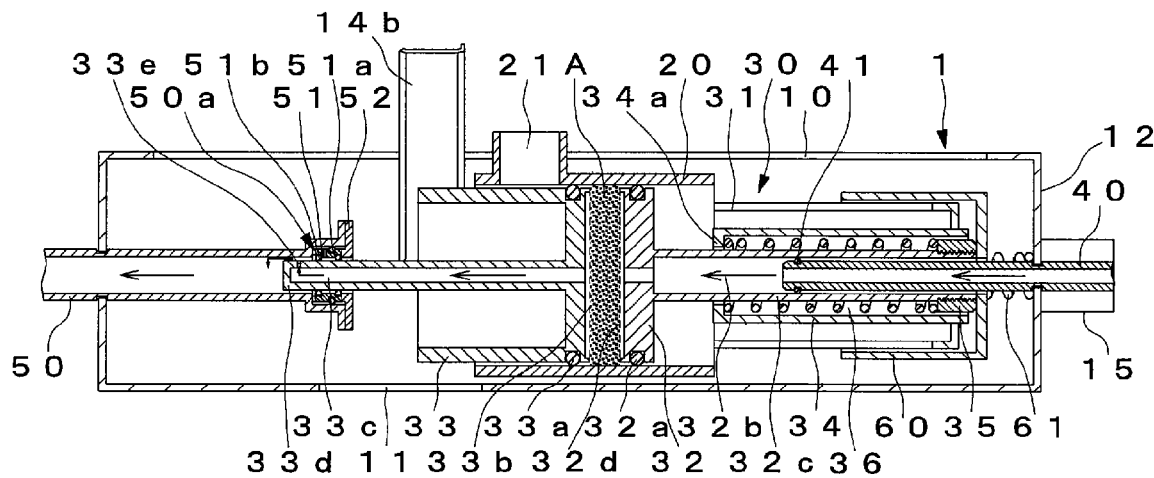
FIG. 12 also illustrates the operation of the extractor to extract regular coffee.

Next, as shown in FIG. 11, the motor 15 is driven to turn the drive shaft 14 in one circumferential direction, and moves the piston unit 30 rightward until the second piston 33 reaches a prescribed regular coffee extracting position. Then, the beverage outlet hole 33e formed in the piston rod 33d of the second piston 33 is positioned to the left of the channel switching member 51 as shown in FIG. 12 to form the first extraction channel. The first piston 32 moves rightward together with the frame 31 to bring the right end of the piston rod 32c into contact with the raw material compressing member 60 to move the raw material compressing member 60 rightward. Then, as the first piston 32 is moved leftward relative to the frame 31 by the urging force of the raw material compressing springs 61 against the rightward urging force of the piston urging spring 36, the raw material A is compressed between the first piston 32 and the second piston 33.

When the second piston 33 moves to the regular coffee extracting position, it drives the pump 5 to supply a predetermined amount of hot water for steaming to the cylinder 20. As the pressure within the cylinder 20 is raised by the supplied hot water for steaming then, the first piston 32 moves rightward against the urging force of the raw material compressing springs 61. This causes the raw material A within the cylinder 20 to flow within the cylinder 20 and spread uniformly all over the space in the cylinder 20.

When a prescribed length of time has passed after the supply of hot water for steaming, the pump 5 is driven to supply a prescribed quantity of hot water for beverage extraction into the cylinder 20 to extract beverage. Then the beverage extracted in the cylinder 20, after being filtered by the filter 33b of the second piston 33, passes the extraction channel 33c of the second piston 33, is discharged into the extraction pipe 50 via the beverage outlet hole 33e, and flows in the extraction pipe 50 to be poured into a cup via the nozzle 7. The pressure within the cylinder 20 into which hot water is supplied then is not more than 0.1 MPa to 0.3 MPa.

Figure 13:
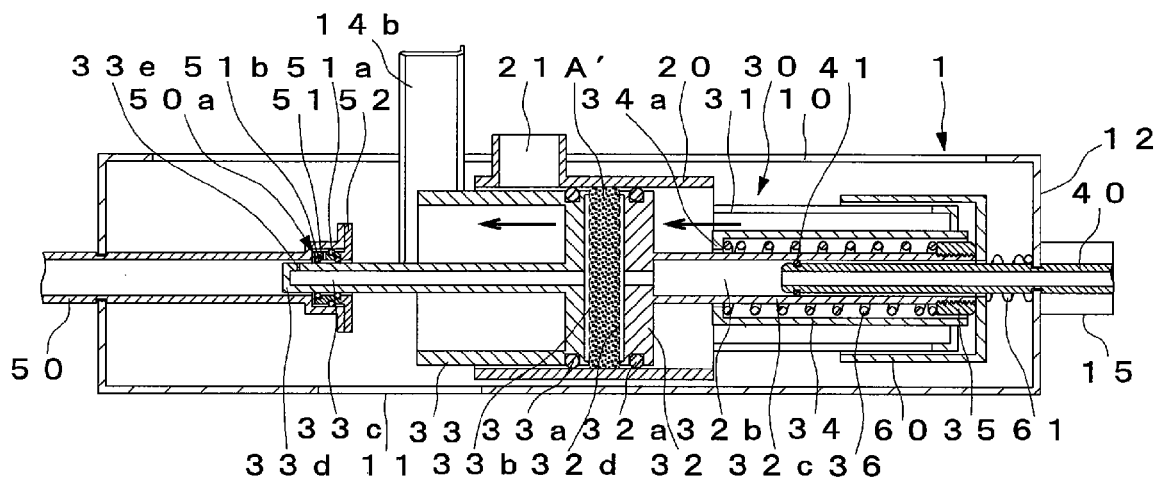
FIG. 13 also illustrates the operation of the extractor to extract regular coffee.
Figure 14:
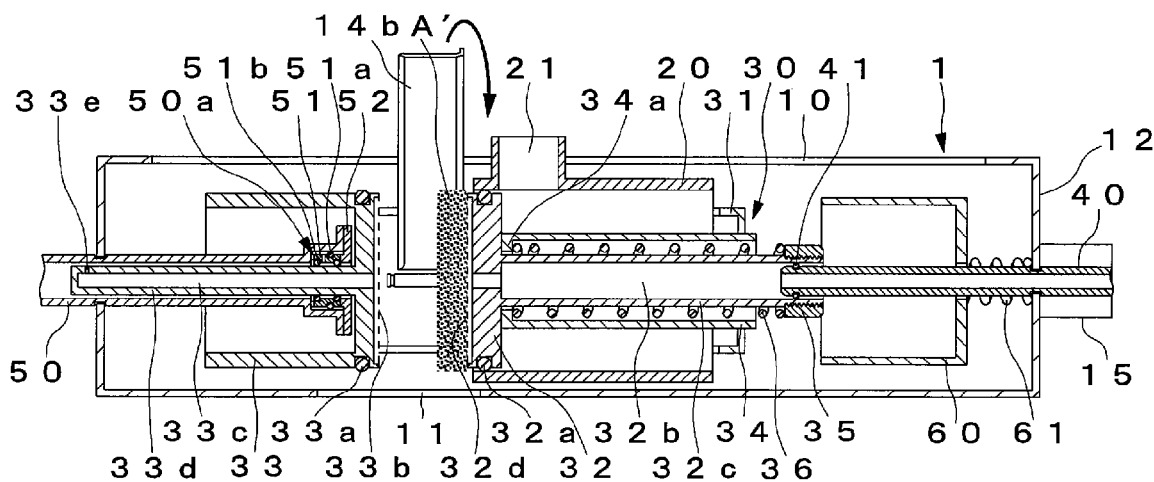
FIG. 14 also illustrates the operation of the extractor to extract regular coffee.
Figure 15:
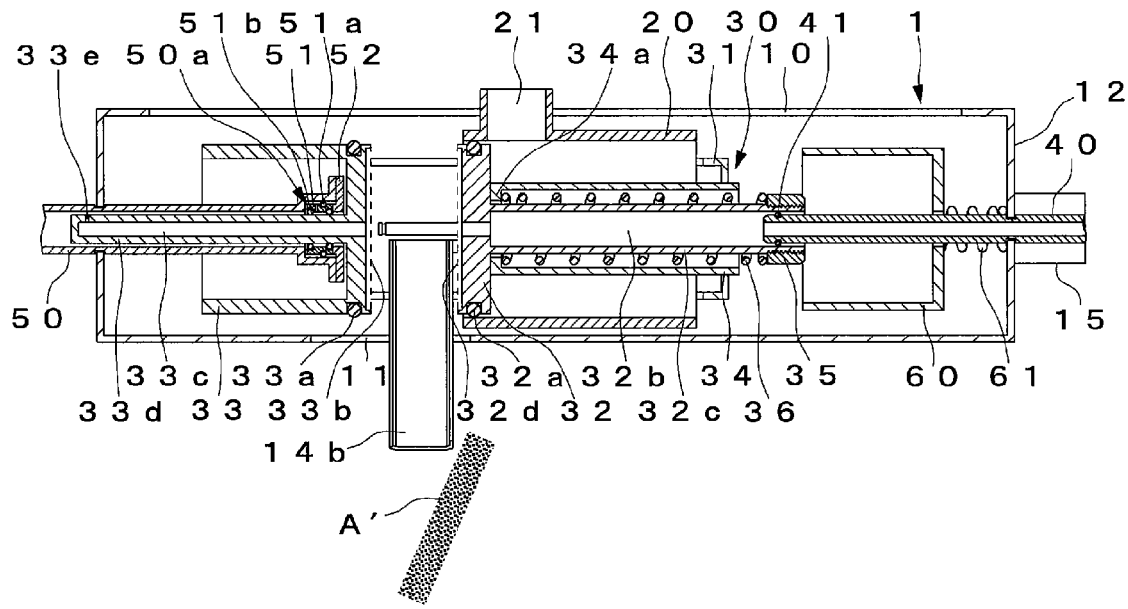
FIG. 15 also illustrates the operation of the extractor to extract regular coffee.

After hot water for beverage extraction is supplied into the cylinder 20 and extracting the beverage, the drive shaft 14 is turned in the other circumferential direction to move the piston unit 30 leftward until the hot water feed plate 32d of the first piston 32 reach the left end of the cylinder 20 as shown in FIG. 13. Then the first piston 32 is urged rightward relative to the frame 31 by the piston urging spring 36, and accordingly the space between the hot water feed plate 32d of the first piston 32 and the filter 33b of the second piston 33 is greater than when extracting the beverage. This enables the used raw material discharge plate 14b, which turns together with the drive shaft 14, to pass between the hot water feed plate 32d of the first piston 32 and the filter 33b of the second piston 33 as shown in FIG. 14, and the used raw material A' is swept off by the used raw material discharge plate 14b to be collected into the used raw material collector via the used raw material discharge outlet 11 as shown in FIG. 15.

After the used raw material A' is discharged, the drive shaft 14 is turned in one circumferential direction to move the piston unit 30 rightward, and the first piston 32 and the second piston 33 are moved to the standby position of the extractor 1 to end the beverage extracting operation.

When espresso coffee is to be extracted, first, beans for espresso coffee are taken out of the canister 2b and ground into a powder form with the mill 3, and the powder is inputted to the cylinder 20 via the raw material inlet 21 as the raw material A (6 grams of it here).

Figure 16:
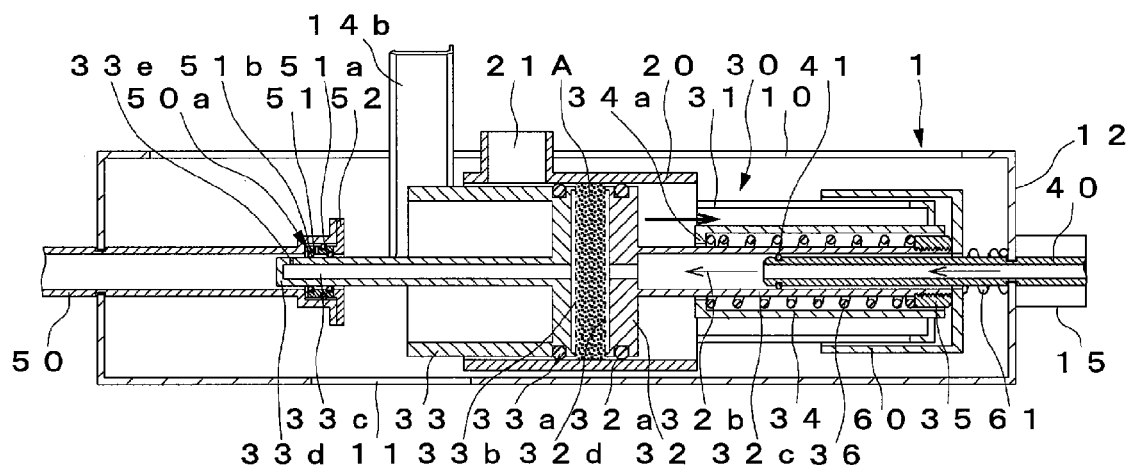
FIG. 16 illustrates the operation of the extractor to extract espresso coffee.

Next, the motor 15 is driven to turn the drive shaft 14 in one circumferential direction, and moves the piston unit 30 rightward until the second piston 33 reaches the prescribed regular coffee extracting position as shown in FIG. 16. Then, the first piston 32 moves rightward together with the frame 13 to bring the right end of the piston rod 32c into contact with the raw material compressing member 60 to move the raw material compressing member 60 rightward. Also, as the first piston 32 is moved leftward relative to the frame 31 by the urging force of the raw material compressing springs 61 against the rightward urging force of the piston urging spring 36, the raw material A is compressed between the first piston 32 and the second piston 33. The force of compressing the raw material A then constitutes a first compressive force.

When the second piston 33 moves to the regular coffee extracting position, it drives the pump 5 to supply a predetermined amount of hot water for steaming to the cylinder 20. As the pressure within the cylinder 20 is raised by the supplied hot water for steaming then, the first piston 32 moves rightward against the urging force of the raw material compressing springs 61. This causes the raw material A within the cylinder 20 to flow within the cylinder 20 and spread uniformly all over the space in the cylinder 20.

Figure 17:
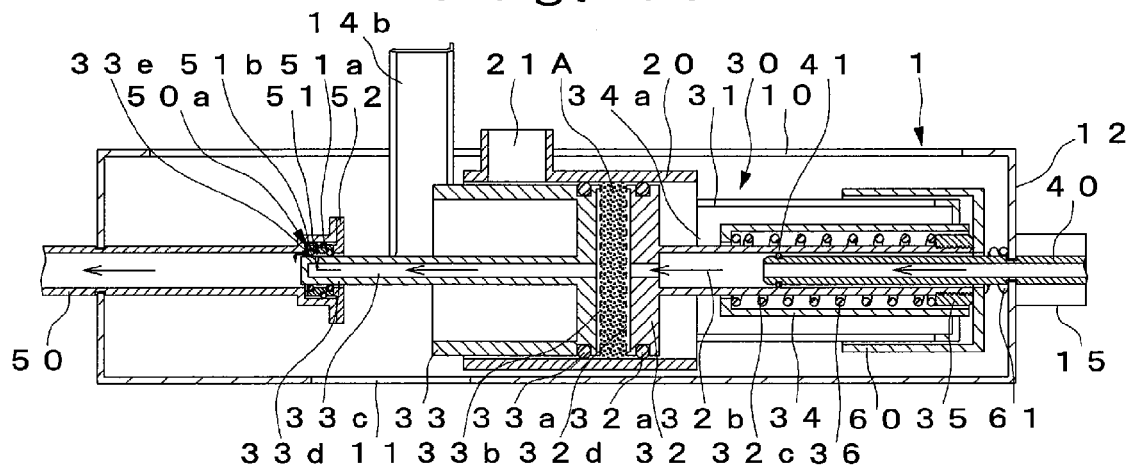
FIG. 17 also illustrates the operation of the extractor to extract espresso coffee.

When a prescribed length of time has passed after the supply of hot water for steaming, the motor 15 is driven to turn the drive shaft 14 in one circumferential direction, and moves the piston unit 30 rightward until the second piston 33 reaches the prescribed espresso coffee extracting position. Then, the beverage outlet hole 33e formed in the piston rod 33d of the second piston 33 is positioned between the seal rings 51b of the channel switching member 51 as shown in FIG. 17 to form the second extraction channel. Also, the first piston 32 moves rightward together with the frame 31 and the right end of the piston rod 32c moves the raw material compressing member 60 farther rightward. Then, as the first piston 32 is moved leftward relative to the frame 31 by the urging force of the raw material compressing springs 61, which is greater than the urging force in the regular coffee extracting position against the rightward urging force of the piston urging spring 36, the raw material A is further compressed between the first piston 32 and the second piston 33. The force of compressing the raw material A then constitutes a second compressive force greater than the first compressive force.

When the second piston 33 moves to the espresso coffee extracting position, it drives the pump 5 to supply a prescribed quantity of hot water for beverage extraction into the cylinder 20 to extract beverage. Then the beverage extracted in the cylinder 20, after being filtered by the filter 33b of the second piston 33, flows in the extraction channel 33c of the second piston 33, and is discharged between the seal rings 51b of the channel switching member 51. The beverage discharged between the seal rings 51b of the channel switching member 51 flows round the outer circumferential part of the channel switching member 51 through the communication hole 51c, is discharged into the extraction pipe 50, and flows in the extraction pipe 50 to be poured into a cup via the nozzle 7. The pressure within the cylinder 20 into which hot water for beverage extraction is supplied then is about 0.9 MPa.

After the extraction of the beverage, as in the operation to extract regular coffee, the drive shaft 14 is turned in the other circumferential direction, and the used raw material A' is swept off by the used raw material discharge plate 14b to be collected into the used raw material collector via the used raw material discharge outlet 11.

After the used raw material A' is discharged, the drive shaft 14 is turned in one circumferential direction to move the piston unit 30 rightward, and the first piston 32 and the second piston 33 are moved to the standby position of the extractor 1 to end the beverage extracting operation.

Figure 18:
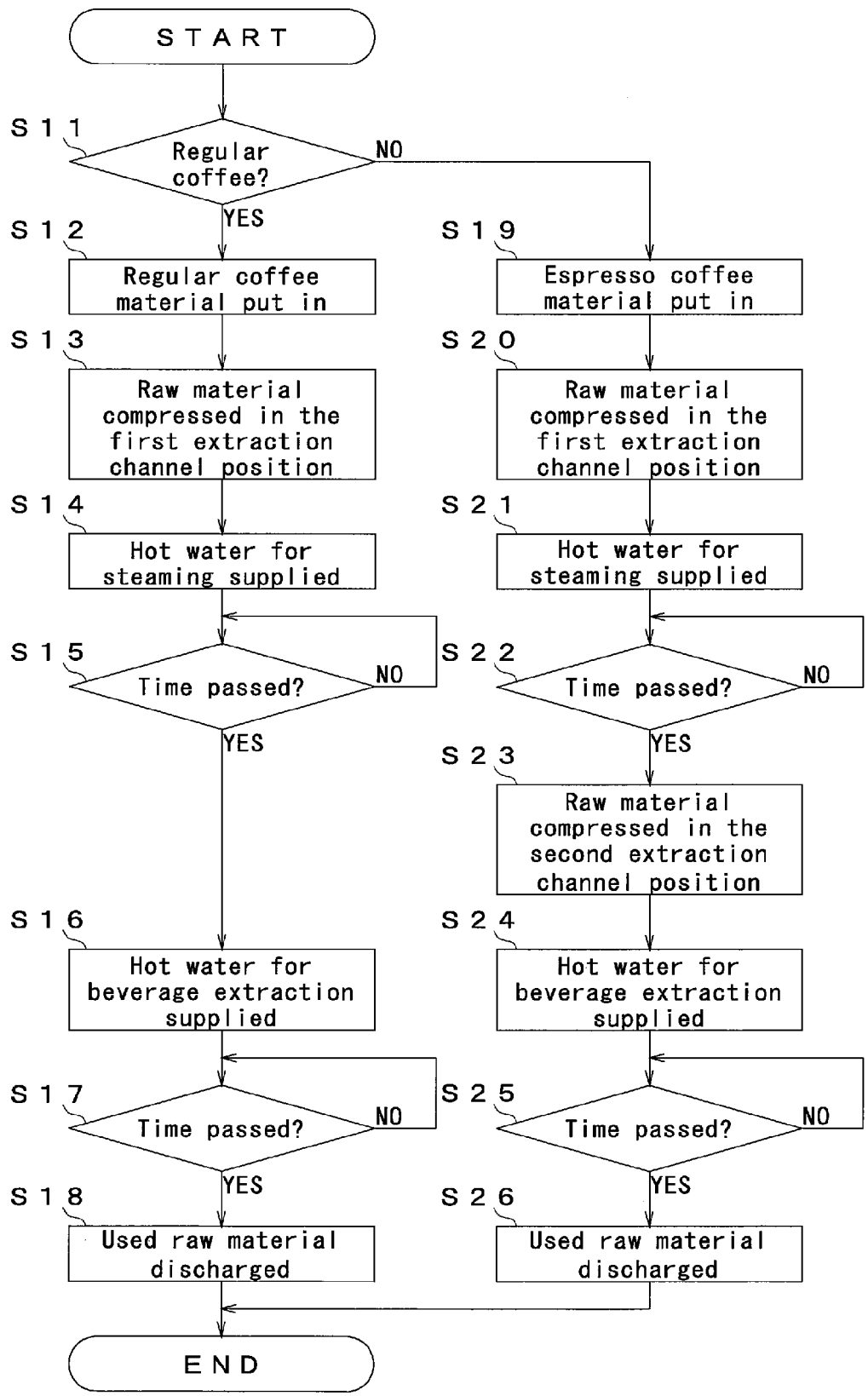
FIG. 18 is a flow chart of the operation to extract a beverage.

The operation of the control unit 70 then to extract regular coffee and espresso coffee will now be described with reference to the flow chart of FIG. 18.

When regular coffee is selected (step S11), coffee beans in the canister 2a are ground with the mill 3, and the resultant coffee powder is put into the cylinder 20 as the raw material A (step S12). Next, the raw material A is compressed in the position where the first extraction channel is set (step S13), and hot water for steaming is supplied into the cylinder 20 (step S14). When a prescribed length of time has passed after the supply of hot water for steaming into the cylinder 20 (step S15), hot water for extraction is supplied into the cylinder 20 (step S16). When a prescribed length of time has passed after the supply of hot water for extraction into the cylinder 20 (step S17), the used raw material A' is discharged (step S18) to end the extracting operation.

When espresso coffee is selected (step S11), coffee beans in the canister 2b are ground with the mill 3, and the resultant coffee powder is put into the cylinder 20 as the raw material A (step S19). Next, the raw material A is compressed in the position where the first extraction channel is set (step S20), and hot water for steaming is supplied into the cylinder 20 (step S21). When a prescribed length of time has passed after the supply of hot water for steaming into the cylinder 20 (step S22), the raw material A is compressed in the position where the second extraction channel is set (step S23), and hot water for extraction is supplied into the cylinder 20 (step S24). When a prescribed length of time has passed after the supply of hot water for extraction (step S25), the used raw material A' is discharged (step S26) to end the extracting operation.

Figure 19:
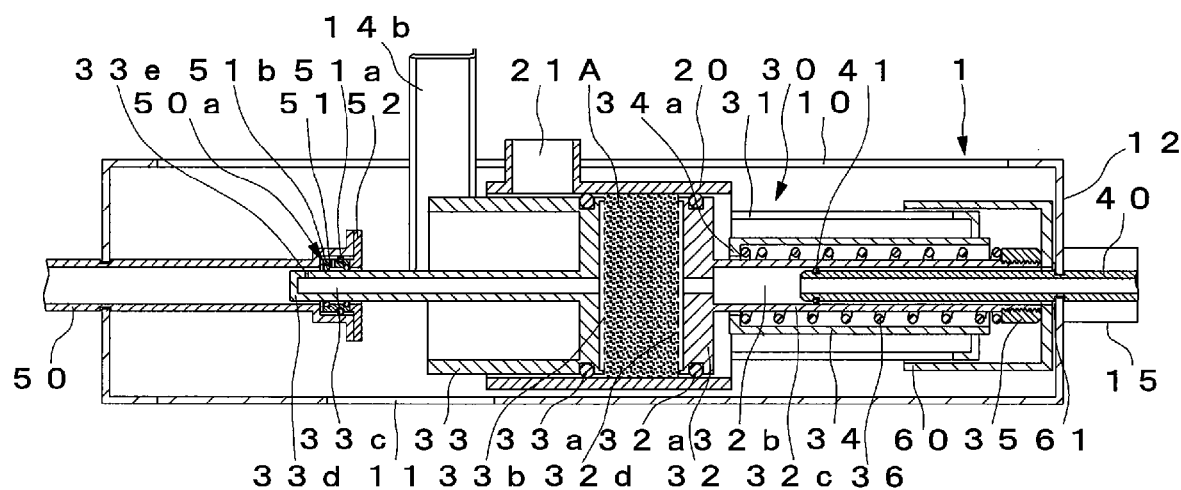
FIG. 19 shows a frontal section of the extractor when it is to extract a large quantity of regular coffee.
Figure 20:
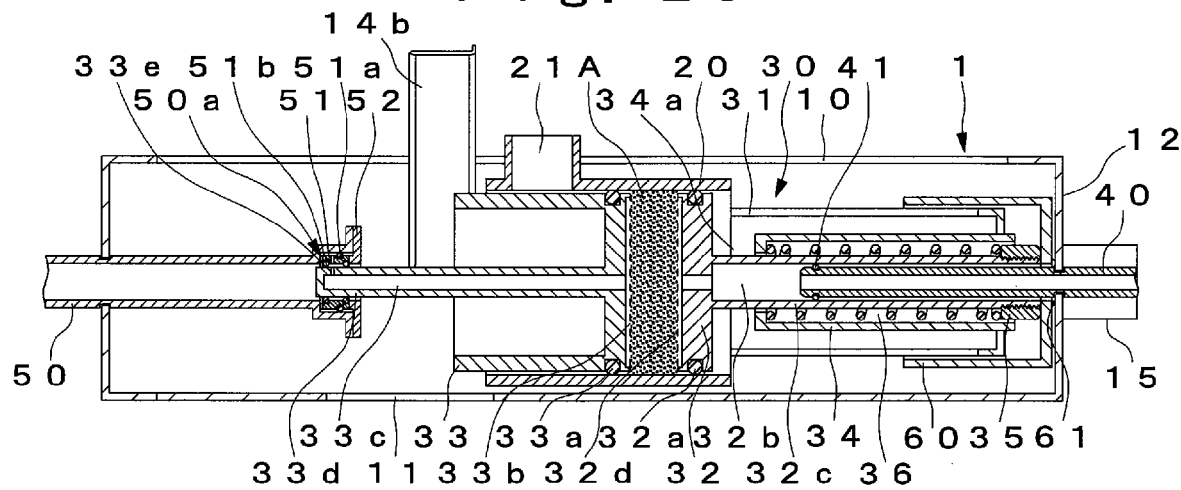
FIG. 20, a frontal section of the extractor when it is to extract a large quantity of espresso coffee.

When the quantity of beverage to be extracted at a time is particularly large, such as when extracting the beverage into a large cup or simultaneously extracting the beverage to be poured into a plurality of cups, a corresponding quantity of coffee beans for regular coffee or for espresso coffee are put into the cylinder 20 as the raw material A to the quantity of the beverage to be extracted, the second piston 33 is moved to the position of extracting regular coffee or espresso coffee, and the beverage is extracted in that position. FIG. 19 shows the positions of the first piston 32 and the second piston 33 when a large quantity of regular coffee is to be extracted (the quantity of the raw material A here is 16 grams), while FIG. 20 shows the positions of the first piston 32 and the second piston 33 when a large quantity of espresso coffee is to be extracted (the quantity of the raw material A here is 12 grams).

The extraction pipe 50 is fixed to the cylinder base 10 and, by connecting the extraction pipe 50 and the nozzle 7 with a beverage channel of the shortest possible length, the beverage can be prevented from being cooled before it is poured into a cup or the crema (cream) of espresso coffee, from being roughened.

As described so far, the beverage extractor of this embodiment of the invention has the first extraction channel which enables the beverage extracted in the cylinder 20 to flow from the beverage outlet hole 33e of the second piston 33 having the prescribed first bore to the extraction pipe 50 and the second extraction channel which enables the beverage extracted in the cylinder 20 to flow to the extraction pipe 50 via the communication hole 51c having the second bore smaller than the beverage outlet hole 33e, and the first extraction channel and the second extraction channel are switched over between each other by moving the second piston 33. Since this arrangement makes possible the choice of the extraction channel suitable for either type of beverage, whether regular coffee or espresso coffee, by moving the second piston 33, it is made possible to extract beverage of high quality irrespective of its type.

The extraction flow is switched over between the first extraction channel and the second extraction channel by moving the second piston 33 from the piston rod 33d on whose circumferential face the beverage outlet hole 33e having the first bore is provided, the cylindrical channel switching member 51 provided within the extraction pipe 50 and having a gap between itself and the inner circumferential face of the extraction pipe 50, the seal ring 51a which seals the gap between the inner circumferential face of the extraction pipe 50 and the outer circumferential face of the channel switching member 51, the pair of seal rings 51b arranged at the two ends of the inner circumferential face of the channel switching member 51 in the direction of its center axis and sealing the gap between the inner circumferential face of the channel switching member 51 and the outer circumferential face of the piston rod 33d, and the communication hole 51c having the second bore which causes the beverage flowing out of the beverage outlet hole 33e to flow from between the seal rings 51b on the inner circumferential face side of the channel switching member 51 toward the downstream side of the seal ring 51a on the outer circumferential face side. This arrangement, as it enables the first extraction channel and the second extraction channel to be switched over between each other in the single extraction pipe 50 without requiring a plurality of extraction pipes, makes possible a saving in installation space without making the equipment configuration more complex.

This embodiment is also provided with the frame 31 to which the second piston 33 is fixed and the first piston 32 is linked to be movable in the direction of the center axis of the cylinder 20 relative to the second piston 33, the piston urging spring 36 provided on the frame 31 and urging the first piston 32 away from the second piston 33, the drive shaft 14 so provided as to be screwed on to the nut 31b of the frame 31 and moving the frame 31 in the direction of the center axis of the cylinder 20 by turning relative to the frame 31, and a raw material compressing mechanism comprising the raw material compressing member 60 and the raw material compressing springs 61 for moving the frame 31 toward the first piston 32 thereby to bring the piston rod 32c provided on the first piston 32 into contact and moving the first piston 32 toward the second piston 33 relative to the frame 31 against the urging force of the piston urging spring 36. As this enables the single motor 15 which turns the drive shaft 14 either forward or backward to move the first piston 32 and the second piston 33, the manufacturing cost can be correspondingly reduced.

Further, the raw material compressing mechanism is configured of the raw material compressing member 60 and the raw material compressing springs 61. When hot water for steaming is supplied into the cylinder 20, as the space between the first piston 32 and the second piston 33 can be varied according to the pressure within the cylinder, the raw material A can be uniformly spread all over within the cylinder 20.

Further, the used raw material A' from which beverage has been extracted is swept off with the used raw material discharge plate 14b, which turns together with the drive shaft 14, by taking out the second piston 33 through the opening of the cylinder 20 and moving the first piston 32 to the vicinity of the opening of the cylinder 20. This enables the used raw material A' to be discharged only by the motor 15 which moves the frame 31 without requiring a separate power source for discharging the used raw material A', and therefore the structure can be simplified and the manufacturing cost can be correspondingly reduced.

Also, the cylinder 20 is so arranged as its center axis is directed horizontally, and the raw material inlet 21 through which to input the raw material A is provided in the upper part of the circumferential face of the cylinder 20. As this makes possible direct connection of the chute 3a for guiding the raw material into the cylinder 20 to the raw material inlet 21, the surroundings of the raw material inlet 21 can be prevented from being smeared by the raw material A.

The force with which the raw material A is compressed in the position of the second piston 33 where the first extraction channel is to be set is made smaller than that with which the raw material A is compressed in the position of the second piston 33 where the second extraction channel is set. This prevents the pressure within the cylinder 20 from rising when regular coffee is to be extracted, and enables the extract within the cylinder 20 to be discharged without delay.

Further, the raw material A put into the cylinder 20 is compressed by the first piston 32 and the second piston 33 with a prescribed compressive force and, when a prescribed length of time has passed after hot water for steaming the raw material A was supplied into the cylinder 20, is compressed by the first piston 32 and the second piston 33 with a second compressive force greater than the first compressive force. This additional compression of the steamed raw material enables the thickness of the raw material A in the direction of the center axis of the cylinder 20 to be uniformized, and accordingly the hot water for beverage extraction to permeate the whole volume of the raw material A.

This embodiment is also provided with the motor 15 for turning the drive shaft 14 and the amperage detector 72 which detects the current flowing to the motor 15. This makes it possible to measure from the amperage detected by the amperage detector 72 the force with which the raw material A is compressed by the first piston 32 and the second piston 33 and thereby to control the force with which the raw material A is compressed to an appropriate level.

The second piston 33 is provided with the filter 33b, and the beverage outlet holes 33f through which beverage passes are arranged all over the filter 33b except the vicinities of the end of the extraction channel 33c of the piston rod 33d. As this can prevent hot water supplied into the cylinder 20 from directly flowing into the extraction channel 33c, the hot water can permeate the whole volume of the raw material A in the cylinder 20.

The boiler 6 for supplying hot water into the cylinder 20 is arranged underneath the cylinder 20. This enables the exhaust heat of the boiler 6 to heat the cylinder 20 and thereby to prevent the extracted beverage from becoming lukewarm.

Figure 21A:
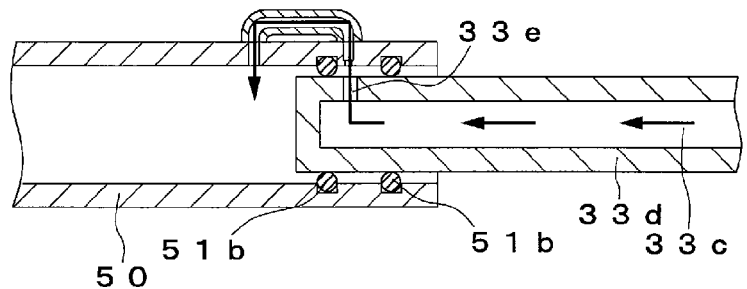
FIG. 21A, a section of the essential part of the extraction pipe in another state in which a second extraction channel is used as the extraction channel.
Figure 21B:
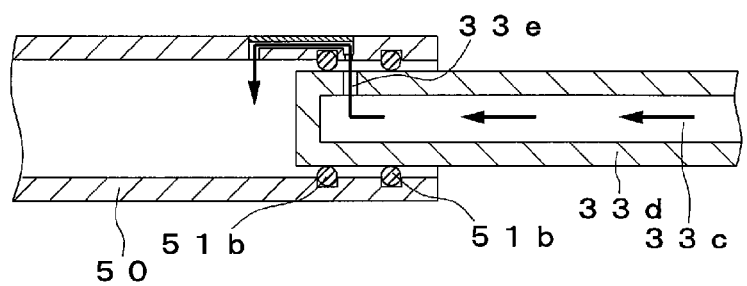
FIG. 21B, also a section of the essential part of the extraction pipe in that other state in which a second extraction channel is used as the extraction channel.

In the embodiment described above, the extraction flow is switched over between the first extraction channel and the second extraction channel by moving the second piston 33 from the piston rod 33d on whose circumferential face the beverage outlet hole 33e having the first bore is provided, the cylindrical channel switching member 51 provided within the extraction pipe 50 and having a gap between itself and the inner circumferential face of the extraction pipe 50, the seal ring 51a which seals the gap between the inner circumferential face of the extraction pipe 50 and the outer circumferential face of the channel switching member 51, the pair of seal rings 51b arranged at the two ends of the inner circumferential face of the channel switching member 51 in the direction of its center axis and sealing the gap between the inner circumferential face of the channel switching member 51 and the outer circumferential face of the piston rod 33d, and the communication hole 51c having the second bore which causes the beverage flowing out of the beverage outlet hole 33e to flow from between the seal rings 51b on the inner circumferential face side of the channel switching member 51 toward the downstream side of the seal ring 51a on the outer circumferential face side. Instead of this configuration, as shown in FIG. 21A and FIG. 21B, the beverage extractor may comprise the piston rod 33d provided with the beverage outlet hole 33e having the first bore in the circumferential face, the pair of seal rings 51b arranged with a space in-between in the direction of the center axis of the extraction pipe 50 on the inner circumferential face of the extraction pipe 50 and sealing the gap between the inner circumferential face of the extraction pipe 50 and the outer circumferential face of the piston rod 33d, and the second extraction channel having the second bore on the outer circumferential face of the extraction pipe 50 or within a member of the extraction pipe 50 to enable the beverage flowing out of the beverage outlet hole 33e to flow from between the seal rings 51b into the extraction pipe 50 on the downstream side between the seal rings 51b. In this case, too, as it enables the first extraction channel and the second extraction channel to be switched over between each other in the single extraction pipe 50 without requiring a plurality of extraction pipes, it is made possible to save the installation space without making the equipment configuration more complex.

In the embodiment described above, the cylinder 20 fixed to the cylinder base 10, the first piston 32 connected to the hot water feed pipe 40 and disposed to be movable in the direction of the center axis of the cylinder 20 and the second piston 33 disposed to be movable in the direction of the center axis of the cylinder 20 and connected to the extraction pipe 50 are provided such that the raw material A is compressed and the extraction channel can be switched over, but the configuration may as well be such that a cylinder to which a hot water feed pipe is connected, disposed to be movable in the direction of its center axis and a piston disposed to be movable in the direction of the center axis of the cylinder and connected to an extraction pipe are provided, the raw material A is compressed by moving the cylinder and the piston, and at the same time the extraction channel is switched over.

In this embodiment, the second piston 33 is movably connected to the extraction pipe 50 and the extraction channel is switched over by moving the second piston 33 relative to the extraction pipe 50, but the configuration may as well be such that an extraction pipe is connected to the cylinder and the extraction pipe is provided with a mechanism which can switch over the extraction channel under interlock with the movement of a piston.

Figure 22:
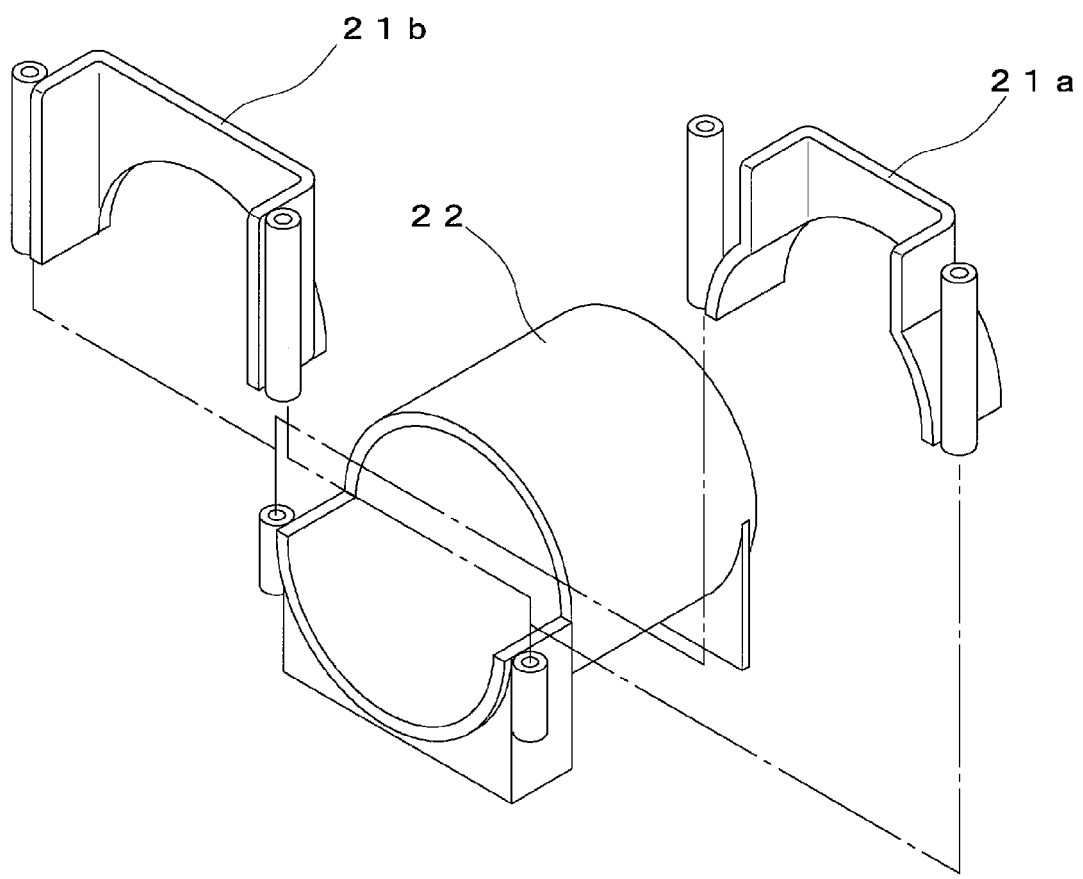
FIG. 22, an exploded perspective view of a cylinder in a second preferred embodiment of the invention.
Figure 23:
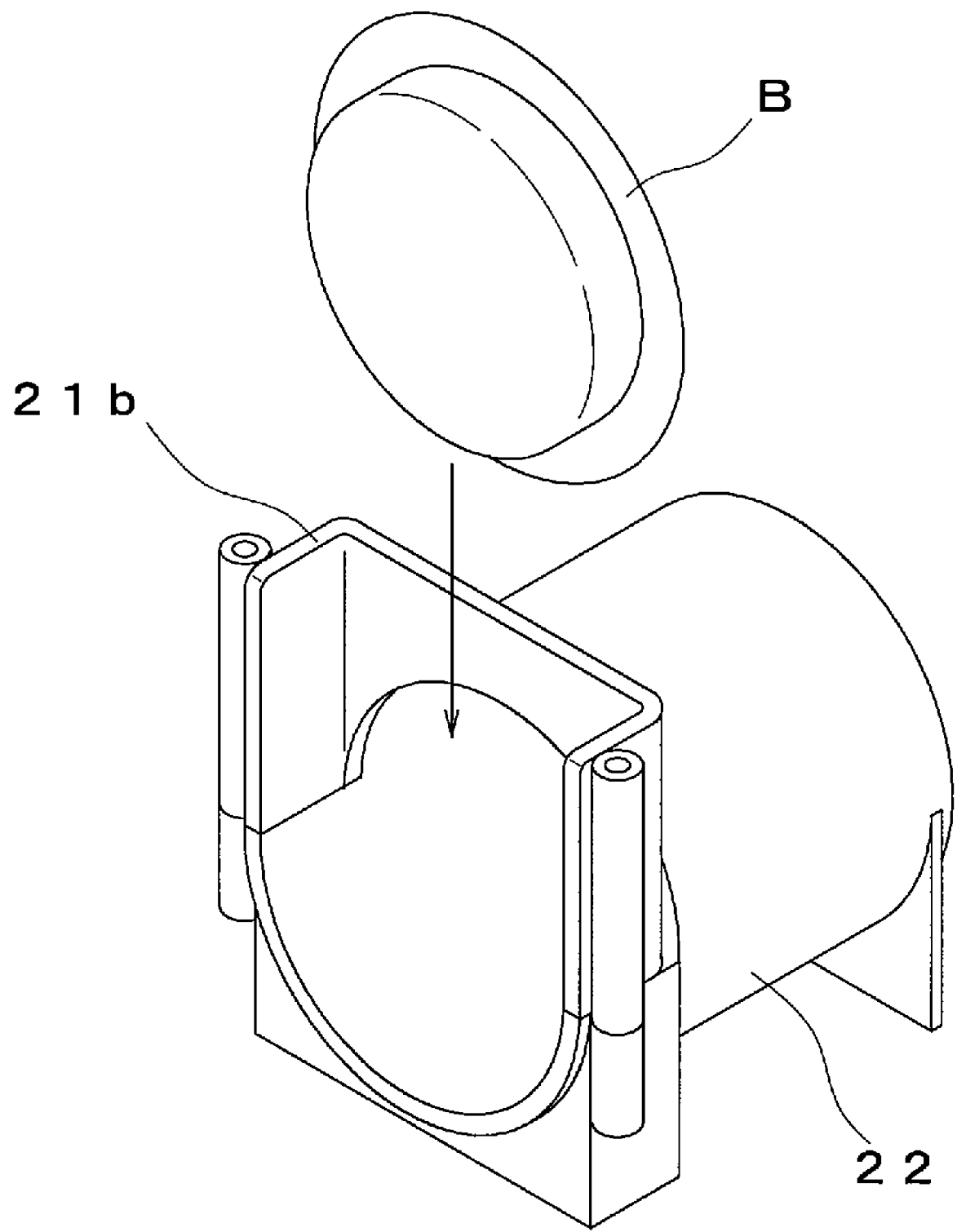
FIG. 23, a perspective view of a cylinder set at a material inlet through which a raw material in a solid form can be inputted.

FIG. 22 and FIG. 23 show a second preferred embodiment of the present invention. The same constituent parts as in the foregoing embodiment are designated by respectively the same reference signs.

This beverage extractor can extract beverage not only from the raw material A in a powder form prepared by grinding coffee beans with the mill 3 but also from a raw material B in a solid form, such as a pod, prepared by covering ground coffee beans in a powder form in a compressed state with a filter of unwoven cloth or the like.

To a cylinder 22 of this beverage extractor can be detachably fitted a raw material inlet member 21a for connecting the chute 3a for guiding the raw material A in a powder form into the cylinder 22 and a raw material inlet member 21b which has an opening larger than the opening of the raw material inlet member 21a in the direction of the diameter of the cylinder 22, and can put the raw material B into the cylinder 22 to this cylinder 22. Thus, by selecting and fitting either the raw material inlet member 21a or the raw material inlet member 21b to the cylinder 22 by screwing or otherwise, it can adapt to whichever of the raw material A and the raw material B.

As described above, in the beverage extractor of this second embodiment, the material inlet to the cylinder 22 is configured to be changeable according to the external dimensions, shape and other attributes of the raw material A to be inputted. In this way, this beverage extractor can extract beverage not only from the raw material A in a powder form prepared by grinding coffee beans with the mill 3 but also from the raw material B in a solid form, such as a pod, prepared by covering ground coffee beans in a powder form in a compressed state with a filter of unwoven cloth or the like, thereby making the beverage extractor adaptable to a broader range of applications.

FIG. 24 through FIG. 32 show a third preferred embodiment of the present invention. Incidentally, the same constituent parts as in the foregoing first and second embodiments are designated by respectively the same reference signs.

This beverage extractor enables, when the raw material A is to be inputted to the cylinder 20, the capacity of the cylinder 20 to be varied according the quantity (volume) of the raw material A to be inputted. In this beverage extractor, the urging force of the piston urging spring 36 to urge the first piston 32 rightward relative to the frame 31 of the extractor 1 is set to be smaller than the frictional force working between the first piston 32 and the inner face of the cylinder 20. Thus, the first piston 32 is not moved within the cylinder 20 only by movements of the frame 31 in the right-and-left directions, but moves rightward pushed by the second piston 33 moving rightward together with the frame 31, or leftward pushed by the piston guide 34 moving leftward together with the frame 31.

The quantity (volume) of the raw material A to be inputted to the cylinder 20 varies with the quantity of coffee beans and the way they are ground. The volume of the raw material A prepared by grinding beans for espresso coffee is smaller than that of the raw material A prepared by grinding beans for regular coffee.

Figure 24:
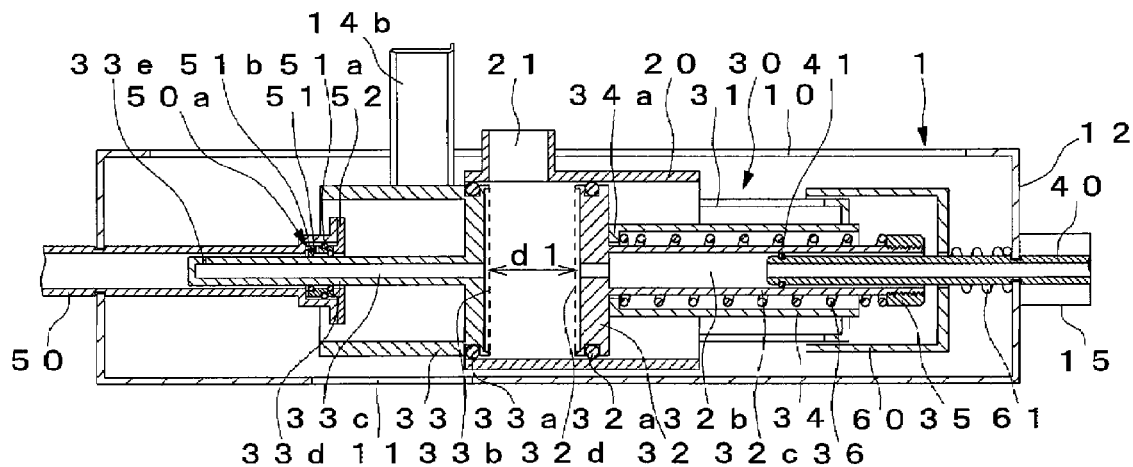
FIG. 24, a frontal section of the extractor in a standby state in a third preferred embodiment of the invention.

In the standby state of the extractor 1 in the beverage extractor configured as described above, the first piston 32 is positioned to the right of the raw material inlet 21 in the cylinder 20, while the second piston 33 is positioned to the left of the raw material inlet 21 in the cylinder 20. The distance between the first piston 32 and the second piston 33 is set, as shown in FIG. 24, to a first distance d1 which is required for accepting the raw material A obtained by grinding beans for regular coffee evenly into the cylinder 20.

When to extract regular coffee, in the standby state of the extractor 1, beans for regular coffee fed out of the canister 2a are ground with the mill 3, and the resultant raw material A in a powder form is put into the cylinder 20 to undergo the regular coffee extracting operation similar to that in the first embodiment of the invention.

Figure 25:
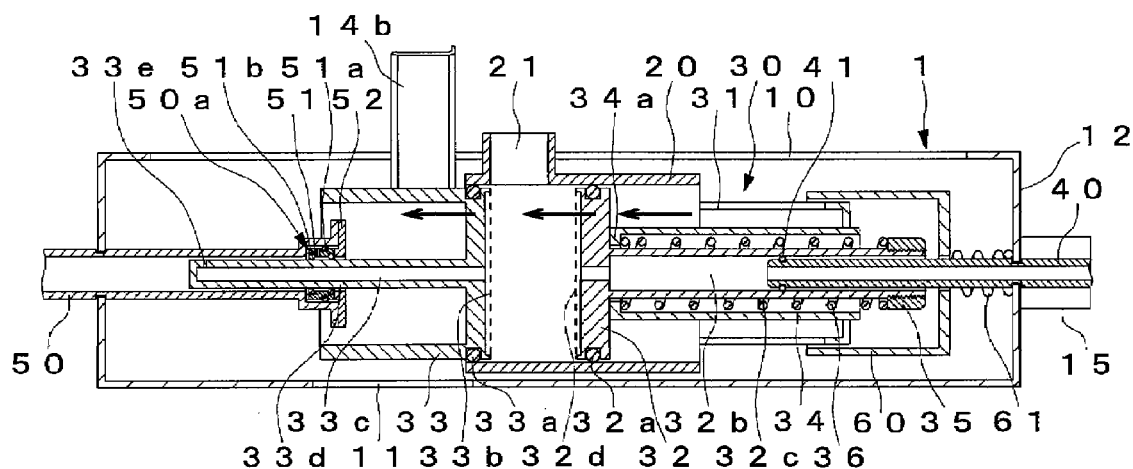
FIG. 25 illustrates the operation of the extractor to alter the distance between a first piston and a second piston from a first distance to a second distance.
Figure 26:
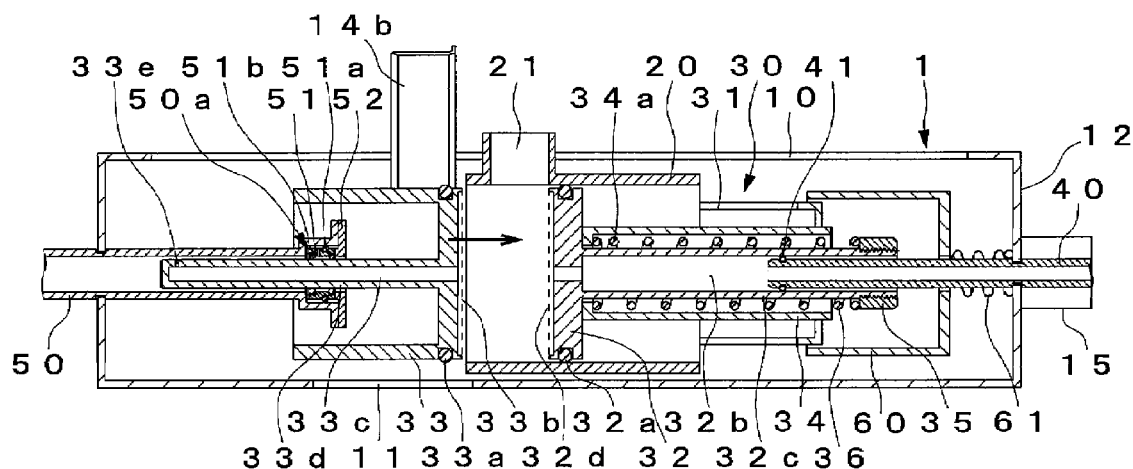
FIG. 26 also illustrates the operation of the extractor to alter the distance between the first piston and the second piston from the first distance to the second distance.
Figure 27:
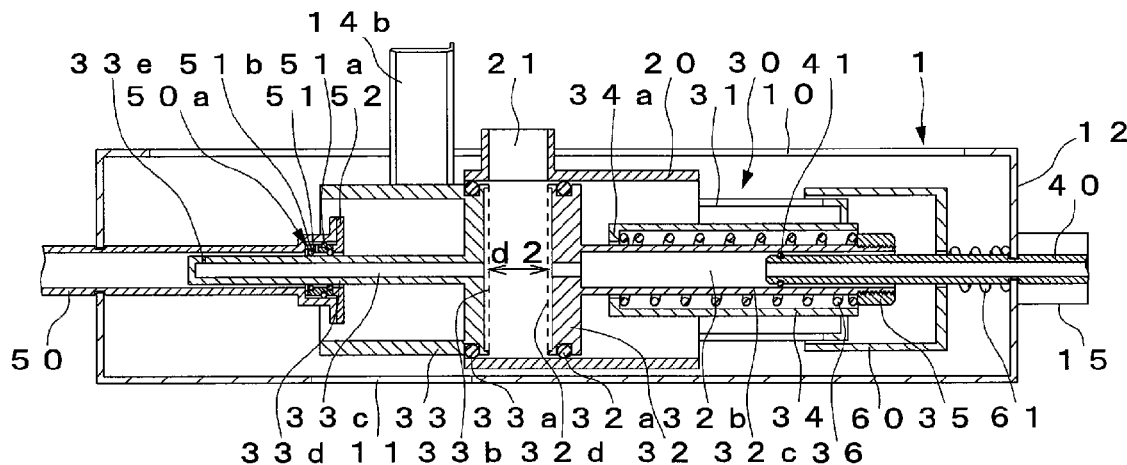
FIG. 27 also illustrates the operation of the extractor to alter the distance between the first piston and the second piston from the first distance to the second distance.

When to extract espresso coffee, as shown in FIG. 25, after the drive shaft 14 is turned in the other circumferential direction to move the piston unit 30 leftward to have the piston guide 34 move the first piston 32 leftward by a prescribed distance, the piston unit 30 is moved rightward by turning the drive shaft 14 in one circumferential direction as shown in FIG. 26, and the second piston 33 is returned to its original position as shown in FIG. 27. After that, the raw material A in a powder form prepared by grinding with the mill 3 beans for espresso coffee fed out of the canister 2b is put into the cylinder 20 to undergo the espresso coffee extracting operation similar to that in the first embodiment of the invention. The distance between the first piston 32 and the second piston 33 then is set to a second distance d2, which is required for accepting the raw material A obtained by grinding beans for espresso coffee evenly into the cylinder 20 and shorter than the first distance d1.

Figure 28:
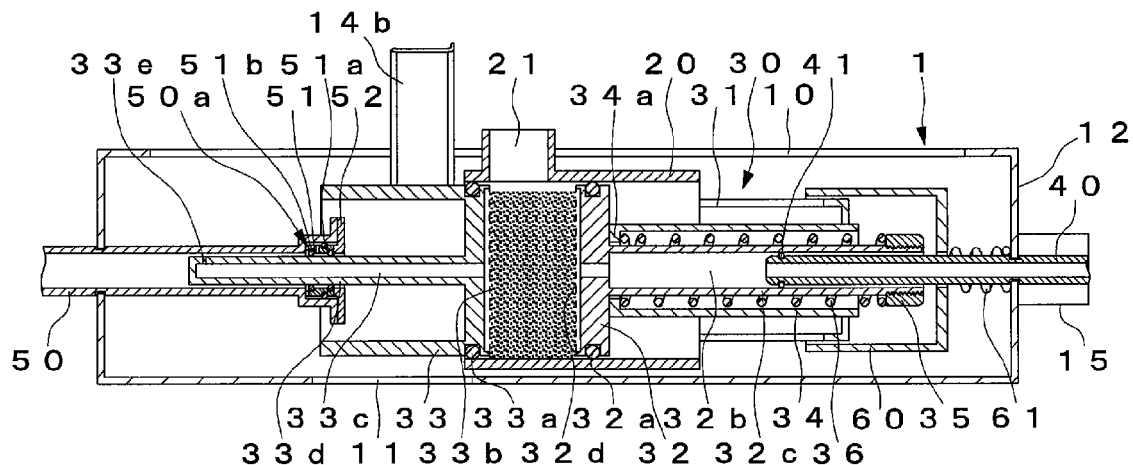
FIG. 28 shows a frontal section of the extractor in a state in which a raw material for regular coffee has been inputted.
Figure 29:
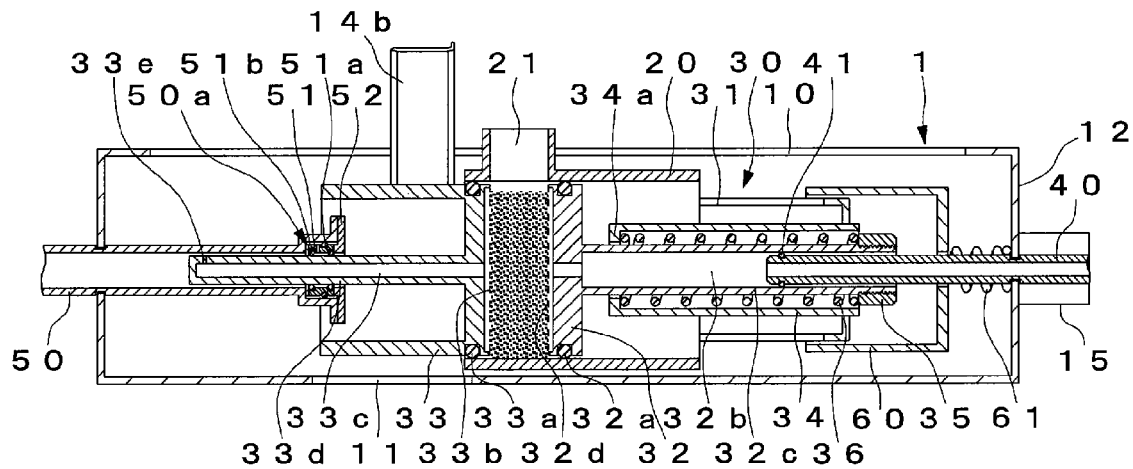
FIG. 29, a frontal section of the extractor in a state in which a raw material for espresso coffee has been inputted.

As this causes the raw material A put into the cylinder 20 to be spread all over in the radial direction of the cylinder 20 as shown in FIG. 28 and FIG. 29, no gap is formed above the cylinder 20 when the raw material A is compressed between the first piston 32 and the second piston 33, and hot water supplied into the cylinder 20 evenly permeates the whole raw material A in the cylinder 20. Nor does the raw material A overflow the cylinder 20, and beverage is extracted from an appropriate quantity of the raw material A.

Figure 30:
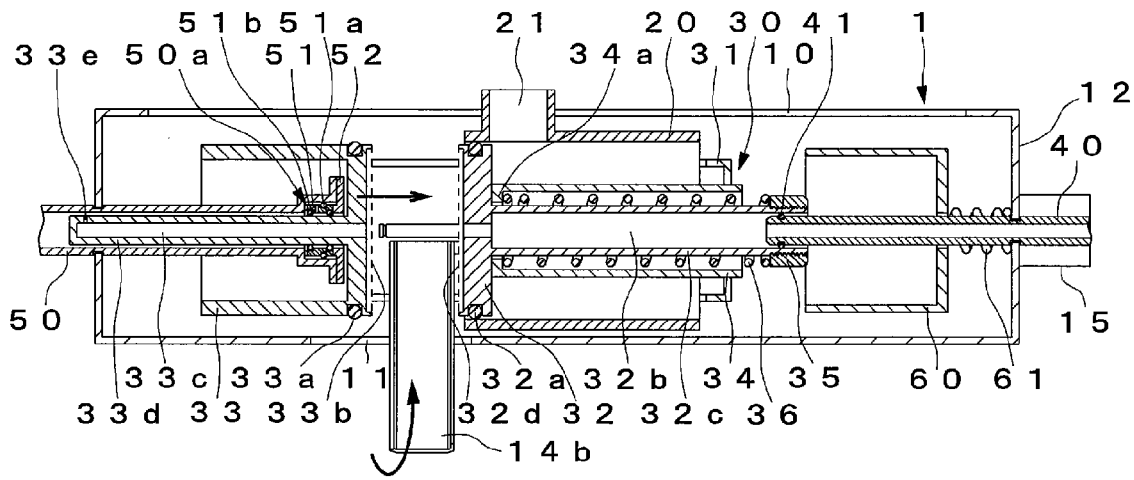
FIG. 30 illustrates the operation of the extractor to move the first piston and the second piston to resume the standby state after the discharging of the used raw material.
Figure 31:
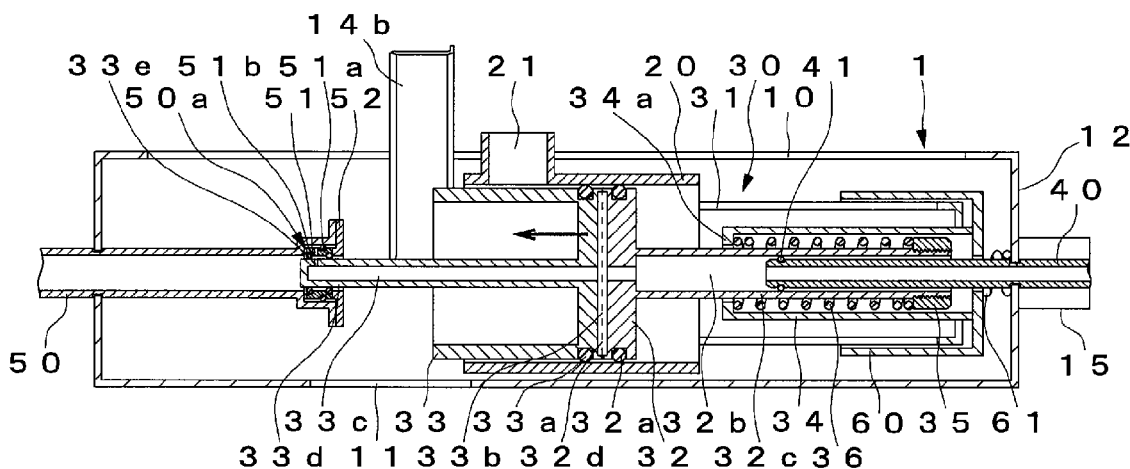
FIG. 31 also illustrates the operation of the extractor to move the first piston and the second piston to resume the standby state after the discharging of the used raw material.
Figure 32:
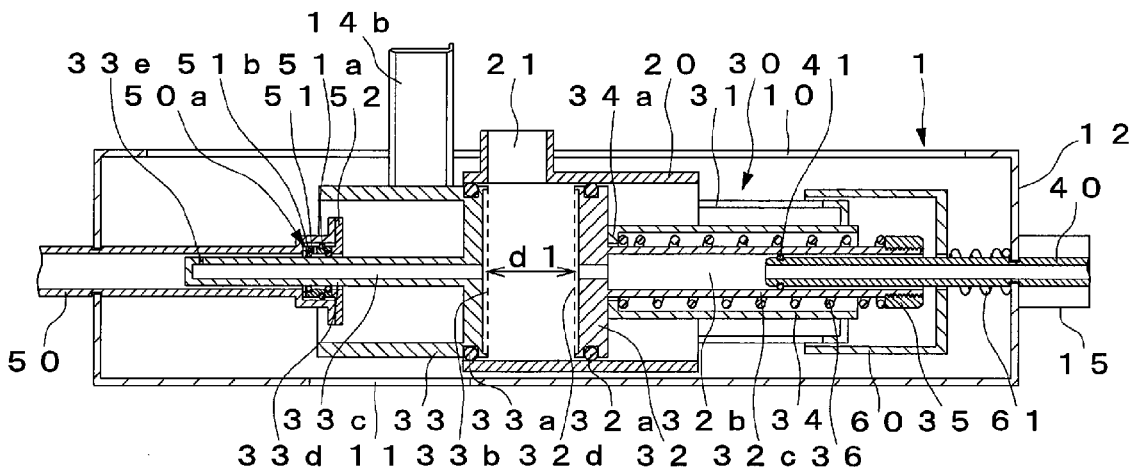
FIG. 32 also illustrates the operation of the extractor to move the first piston and the second piston to resume the standby state after the discharging of the used raw material.

After the beverage is extracted and the used raw material A' is discharged, the drive shaft 14 is turned in one circumferential direction as shown in FIG. 30 to move the piston unit 30 rightward and the second piston 33 is moved to the position of extracting espresso coffee. This causes the first piston 32 to be moved rightward by the second piston 33. After that, as shown in FIG. 31, the drive shaft 14 is turned in the other circumferential direction to move the piston unit 30 leftward, and the second piston 33 is brought to halt to the left of the raw material inlet 21 in the cylinder 20. This causes the extractor 1 to be placed in the standby state in which the first piston 32 and the second piston 33 are at the first distance d1 from each other as shown in FIG. 32.

Thus, in the beverage extractor of this embodiment, the distance between the first piston 32 and the second piston 33 when the raw material A is to be put into the cylinder 20 can be varied according to the quantity (volume) of the raw material to be put into the cylinder 20. As the raw material A put into the cylinder 20 can be spread all over in the radial direction of the cylinder 20, the quality of the extracted beverage can be kept high.

Further, the use of the piston urging spring 36 set to an urging force smaller than the frictional force working between the first piston 32 and the inner face of the cylinder 20 enables the second piston 33 to move relative to the first piston 32 within the cylinder 20. As this arrangement enables the distance between the first piston 32 and the second piston 33 to be altered by the movement of the piston unit 30 without requiring complex mechanisms or dedicated power to move the first piston 32 and the second piston 33 separately, the manufacturing cost can be reduced.

Figure 33A:
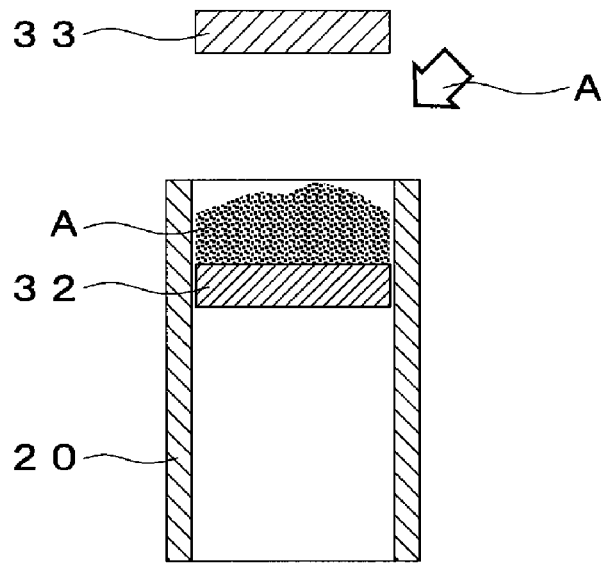
FIG. 33A shows a schematic configuration of the extractor in another example.
Figure 33B:
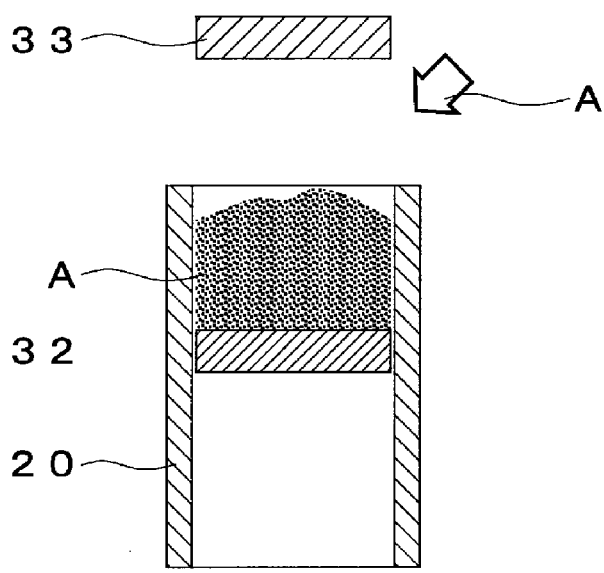
FIG. 33B also shows a schematic configuration of the extractor in that other example.

Incidentally, though the foregoing description of the third embodiment supposes that the cylinder 20 is arranged to orient its center axis horizontally, the raw material inlet 21 through which the raw material A is to be put into the cylinder 20 is formed in the upper part of the circumferential face of the cylinder 20 and the capacity of the cylinder 20 is altered by separately moving the first piston 32 and the second piston 33, as shown in FIG. 33A, a cylinder 20 having no raw material inlet 21 may be arranged with its center axis oriented perpendicularly, and the raw material A may be inputted and the used raw material A' discharged by taking out the second piston 33 through the end of the cylinder 20 toward the second piston 33. In this case, by moving the first piston 32 downward when putting the raw material A into the cylinder 20, as shown in FIG. 33B, the capacity of the cylinder 20 can be enlarged to increase the volume of the raw material A that can be accommodated into the cylinder 20, and accordingly the raw material A put into the cylinder 20 does not overflow the cylinder 20.

Incidentally, the preferred embodiments of the invention described in this specification are only illustrative but do not limit the scope of the invention, which is stated in the appended claims, and all the modifications which fall under the intent of the claims are to be covered by the invention.

The invention claimed is:

1. A beverage extractor comprising:
   a cylinder for accommodating a raw material;
   a piston disposed to be movable within the cylinder;
   an electric motor for moving the piston relative to the cylinder;
   a hot water feed pipe for supplying hot water into the cylinder;
   an extraction pipe for causing a beverage extracted in the cylinder to flow out;
   a first extraction channel for causing the beverage extracted in the cylinder to flow into the extraction pipe via a hole of a prescribed first bore;
   a second extraction channel for causing the beverage extracted in the cylinder to flow into the extraction pipe via a hole of a prescribed second bore, which is smaller than the first bore; and
   a channel switching mechanism for switching over the first extraction channel and the second extraction channel between each other by the motor, the channel switching mechanism is linked to the piston,
   wherein said piston has a piston rod which is inserted into the extraction pipe to be movable within the extraction pipe and has the extraction channels inside, and
   said channel switching mechanism includes the piston rod having a beverage outlet hole of the first bore in the circumferential face thereof, a pair of seal rings disposed with a space in-between in the direction of the center axis of the extraction pipe to seal the gap between the inner circumferential face of the extraction pipe and the outer circumferential face of the piston rod, and a communication channel provided with a channel of the second bore for letting the beverage flowing out of the beverage outlet hole flow from between the pair of seal rings to the extraction pipe on the downstream side between the seal rings.

2. The beverage extractor according to claim 1, further comprising:
   a raw material compressing piston arranged opposite said piston to compress the raw material within the cylinder in conjunction with said piston;
   a frame to which said piston is fixed and the raw material compressing piston is linked to be movable relative to said piston in the direction of the center axis of the cylinder;
   a piston urging member for urging the raw material compressing piston away from said piston;
   a drive shaft disposed to be screwed onto the frame to move the frame in the direction of the center axis of the cylinder by turning relative to the frame; and
   a raw material compressing mechanism for compressing the raw material in the cylinder by moving the raw material compressing piston toward said piston relative to the frame against the urging force of the piston urging member by the movement of the frame toward the raw material compressing piston.

3. The beverage extractor according to claim 2, wherein:
   said drive shaft is connected to a rotating shaft of the motor, the extractor comprising: an amperage detector for detecting the amperage of the current flowing to the motor.

4. The beverage extractor according to claim 2, wherein:
   the raw material compressing mechanism includes a raw material compressing member disposed to be movable in the direction of the center axis of the cylinder and with which the raw material compressing piston moving together with the frame comes into contact, and a raw material compression urging member which gives the raw material compressing piston an urging force toward said piston relative to said piston via the raw material compressing member.

5. The beverage extractor according to claim 1, further comprising:
   an opening disposed at the end of said cylinder toward said piston, through which said piston can be inserted or withdrawn; and
   a used raw material discharge plate disposed to be turnable together with the drive shaft to sweep off the used raw material after beverage extraction, exposed from the opening in the cylinder by withdrawing said piston through the opening in the cylinder.

6. The beverage extractor according to claim 2, wherein:
   said cylinder is arranged to orient the center axis thereof horizontally, and a raw material inlet through which the raw material is to be put into the cylinder is formed in the upper part of the circumferential face thereof.

7. The beverage extractor according to claim 6, wherein:
   the opening of the raw material inlet of said cylinder is made variable in shape and size to enable raw materials differing in external shape, size and other attributes to be put into the cylinder.

8. The beverage extractor according to claim 6, further comprising:
   a piston moving mechanism for adjusting the distance between said piston and the material compressing piston according to the volume of the raw material to be put into the cylinder.

9. The beverage extractor according to claim 8, wherein:
   said piston moving mechanism moves said piston relative to the raw material compressing piston in the cylinder by using a piston urging member whose urging force is smaller than the frictional force working between the raw material compressing piston and the inner face of the cylinder.

10. The beverage extractor according to claim 2, wherein:
    said cylinder has an opening disposed toward the end of said piston, through which said piston can be inserted or withdrawn, the extractor comprising:
    a piston moving mechanism for adjusting the distance between the raw material compressing piston and the opening in the cylinder according to the volume of the raw material to be put into the cylinder via the opening.

11. The beverage extractor according to claim 1, wherein:
    the compressive force working on the raw material when said first extraction channel is set is smaller than that working on the raw material when the second extraction channel is set.

12. The beverage extractor according to claim 1, further comprising:
    a compressive force control device for compressing the raw material put into said cylinder with a prescribed first compressive force and, when a prescribed length of time has passed after hot water for steaming the raw material is supplied into the cylinder, compressing the raw material with a prescribed second compressive force greater than the first compressive force.

13. The beverage extractor according to claim 1, wherein:
said piston has a filter for filtering the extract; and
the filter has beverage outlet holes to let the beverage pass all over except the vicinities of the end of the extraction channel.

14. The beverage extractor according to claim 1, further comprising:
a boiler for generating hot water to be supplied into said cylinder, wherein:
the boiler is arranged underneath the cylinder.

15. A beverage extractor comprising:
a cylinder for accommodating a raw material;
a piston disposed to be movable within the cylinder;
an electric motor for moving the piston relative to the cylinder;
a hot water feed pipe for supplying hot water into the cylinder;
an extraction pipe for causing a beverage extracted in the cylinder to flow out
a first extraction channel for causing the beverage extracted in the cylinder to flow into the extraction pipe via a hole of a prescribed first bore;
a second extraction channel for causing the beverage extracted in the cylinder to flow into the extraction pipe via a hole of a prescribed second bore, which is smaller than the first bore; and
a channel switching mechanism for switching over the first extraction channel and the second extraction channel between each other by the motor, the channel switching mechanism is linked to the piston,
wherein said piston has a piston rod which is inserted into the extraction pipe to be movable within the extraction pipe and has the extraction channels inside, and
said channel switching mechanism includes the piston rod having a beverage outlet hole of the first bore in the circumferential face thereof, a cylindrical channel switching member disposed within the extraction pipe and having a gap from the inner circumferential face of the extraction pipe, a first seal ring for sealing the gap between the inner circumferential face of the extraction pipe and the outer circumferential face of the channel switching member, a pair of second seal rings arranged at the two ends of the inner circumferential face of the channel switching member in the direction of its center of axis to seal the gap between the inner circumferential face of the channel switching member and the outer circumferential face of the piston rod, and a communication channel disposed in the channel switching member to let the beverage flowing out of the beverage outlet hole flow from between the pair of second seal rings toward the inner circumferential face of the channel switching member to the downstream side of the first seal rings toward the outer circumferential face of the channel switching member.

* * * * *